United States Patent
Hopen et al.

(10) Patent No.: US 7,779,469 B2
(45) Date of Patent: Aug. 17, 2010

(54) PROVISIONING AN OPERATING ENVIRONMENT OF A REMOTE COMPUTER

(75) Inventors: Chris Hopen, Shoreline, WA (US); Gary Tomlinson, Woodinville, WA (US); Parvez Anandam, Seattle, WA (US); Brian Young, Portland, OR (US); Alan Flagg, Seattle, WA (US)

(73) Assignee: Aventail LLC, Sunnyvale, CA (US)

( * ) Notice: Subject to any disclaimer, the term of this patent is extended or adjusted under 35 U.S.C. 154(b) by 403 days.

(21) Appl. No.: 11/927,310

(22) Filed: Oct. 29, 2007

(65) Prior Publication Data

US 2008/0148364 A1 Jun. 19, 2008

Related U.S. Application Data

(63) Continuation of application No. 11/009,692, filed on Dec. 10, 2004.

(60) Provisional application No. 60/528,870, filed on Dec. 10, 2003.

(51) Int. Cl.
*G06F 15/173* (2006.01)
(52) U.S. Cl. .......... 726/22; 709/220; 709/224; 709/226
(58) Field of Classification Search .......... 726/22; 709/226
See application file for complete search history.

(56) References Cited

U.S. PATENT DOCUMENTS

| | | | |
|---|---|---|---|
| 6,052,780 A | 4/2000 | Glover | |
| 6,128,279 A | 10/2000 | O'Neil et al. | |
| 6,138,153 A | 10/2000 | Collins, III et al. | |
| 6,199,099 B1 | 3/2001 | Gershman et al. | |
| 6,244,758 B1* | 6/2001 | Solymar et al. | 709/224 |
| 6,269,392 B1* | 7/2001 | Cotichini et al. | 709/200 |
| 6,300,863 B1* | 10/2001 | Cotichini et al. | 340/5.8 |
| 6,321,334 B1* | 11/2001 | Jerger et al. | 726/1 |
| 6,675,206 B1 | 1/2004 | Britton | |
| 6,701,437 B1 | 3/2004 | Hoke et al. | |
| 6,850,943 B2 | 2/2005 | Teixeira et al. | |

(Continued)

FOREIGN PATENT DOCUMENTS

EP 0804012 10/1997

(Continued)

OTHER PUBLICATIONS

Sheryl Canter, "Kill Internet Ads with HOSTS and PAC Files," Online! Mar. 30, 2004, Retrieved from the Internet: URL:http://web.archive.org/web20040426140542/http://www.windowsdevcenter.com/pub/a/ windows/2004/03/30/hosts.html, retrieved on Jan. 24, 2006.

(Continued)

*Primary Examiner*—Christian LaForgia
(74) *Attorney, Agent, or Firm*—Carr & Ferrell LLP

(57) ABSTRACT

Systems and techniques are provided for controlling requests for resources from remote computers. A remote computer's ability to access a resource is determined based upon the computer's operating environment. The computer or computers responsible for controlling access to a resource will interrogate the remote computer to ascertain its operating environment. The computer or computers responsible for controlling access to a resource may, for example, download one or more interrogator agents onto the remote computer to determine its operating environment. Based upon the interrogation results, the computer or computers responsible for controlling access to a resource will control the remote computer's access to the requested resource.

16 Claims, 13 Drawing Sheets

U.S. PATENT DOCUMENTS

| | | | |
|---|---|---|---|
| 6,873,988 B2 | 3/2005 | Herrmann et al. | |
| 6,874,028 B1 | 3/2005 | Feinleib et al. | |
| 6,920,502 B2 | 7/2005 | Araujo et al. | |
| 6,996,631 B1 | 2/2006 | Aiken, Jr. | |
| 7,017,162 B2 | 3/2006 | Smith | |
| 7,073,093 B2 | 7/2006 | Mannarsamy | |
| 7,092,987 B2* | 8/2006 | Brittingham et al. | 709/203 |
| 7,093,024 B2 | 8/2006 | Craddock | |
| 7,099,955 B1 | 8/2006 | Gregg | |
| 7,127,493 B1* | 10/2006 | Gautier | 709/217 |
| 7,222,172 B2 | 5/2007 | Arakawa | |
| 7,493,380 B2 | 2/2009 | Aman et al. | |
| 2002/0053031 A1 | 5/2002 | Bendinelli et al. | |
| 2002/0099937 A1 | 7/2002 | Tuomenoksa | |
| 2002/0112052 A1* | 8/2002 | Brittingham et al. | 709/224 |
| 2002/0167965 A1 | 11/2002 | Beasley et al. | |
| 2002/0198984 A1 | 12/2002 | Goldstein et al. | |
| 2003/0074472 A1 | 4/2003 | Lucco et al. | |
| 2003/0191944 A1 | 10/2003 | Rothrock | |
| 2003/0196091 A1 | 10/2003 | Raley et al. | |
| 2003/0196121 A1* | 10/2003 | Raley et al. | 713/201 |
| 2003/0229613 A1 | 12/2003 | Zargham et al. | |
| 2004/0003084 A1 | 1/2004 | Malik | |
| 2004/0015961 A1* | 1/2004 | Chefalas et al. | 717/178 |
| 2004/0078471 A1 | 4/2004 | Yang | |
| 2004/0148439 A1 | 7/2004 | Harvey et al. | |
| 2004/0153533 A1 | 8/2004 | Lewis | |
| 2004/0249919 A1* | 12/2004 | Mattheis | 709/223 |
| 2005/0044544 A1* | 2/2005 | Slivka et al. | 717/174 |
| 2005/0120095 A1 | 6/2005 | Aman et al. | |
| 2005/0273779 A1* | 12/2005 | Cheng et al. | 717/168 |
| 2006/0271544 A1 | 11/2006 | Devarakonda et al. | |

FOREIGN PATENT DOCUMENTS

| | | |
|---|---|---|
| EP | 1308822 | 5/2003 |
| WO | WO99/57866 | 11/1999 |
| WO | WO02/37799 | 5/2002 |
| WO | 2002099571 A2 | 12/2002 |
| WO | WO02/099571 | 12/2002 |

OTHER PUBLICATIONS

Ulrich Kritzner, "Objektrferenz-Das Navigator-Objekt" Javascript-Tutorial, Online! Mar. 31, 2002, XP 002331683 Retrieved from website: http://web/archive/org/20020331004028/ttp://js-tut-aardon.de/js-tut/anhangA/navigator/html.

"Microsoft(r) Computer Dictionary."Fifth Edition. Microsoft Press. May 1, 2002. 2pgs.

* cited by examiner

FIGURE 5A

| | | Action | Description | Users | Destination | Method | Zone |
|---|---|---|---|---|---|---|---|
| ☐ | 1 | ▭ | IT Dept. Managers | IT Managers | Any | | Any |
| ☐ | 2 | ▭ | HR Dept. Laptop Users | HR Managers | Any | Any | |
| ☐ | 3 | ▭ | Remote office desktops | Any | Corporate Intranet | | Any |
| ☐ | 4 | ▭ | Default Workplace permit all rule. | Any | ASAP WorkPlace | | Any |

Access Control — Review and manage your access control rules.
Display: All
New | Delete | Copy | Move Up | Move Down 501, 503, 505, 507, 509, 511, 513, 515, 517

FIGURE 5B

Add/Edit Access Rule — Access Control > Add/Edit Access Rule
Create or modify an access control rule.
Number: *  [ 1 ]   ID: AV1095017111664
Description: [ ]   The Description appears in log files and is useful in debugging.
Action: ⦿ Permit  ○ Deny  ○ Disabled 519, 521, 523, 525

PROVISIONING AN OPERATING ENVIRONMENT OF A REMOTE COMPUTER

RELATED APPLICATIONS

This application is a continuation and claims the priority benefit of U.S. patent application Ser. No. 11/009,692, filed Dec. 10, 2004 and entitled "End Point Control," which claims the priority benefit of U.S. provisional patent application No. 60/528,870, filed Dec. 10, 2003 and entitled "Network Appliance," the disclosure of the aforementioned provisional application being incorporated herein by reference.

FIELD OF THE INVENTION

The present invention relates to the determination of access to resources on a remote server computer over a network. Various aspect of the invention may be used to limit access to resources on a remote computer based upon a user's computing environment.

BACKGROUND OF THE INVENTION

In the last decade, the use of electronic computer networks has greatly increased. Electronic computer networks may be found in businesses, schools, hospitals, and even residences. With these networks, two or more computing devices communicate together to exchange packets of data according to one or more standard protocols, such as the TCP/IP protocols. Usually, one computer, often referred to as a "client," requests that a second computer perform a service. In response, the second computer, often referred to as a "server," performs the service and communicates the resulting data back to the first computer.

As reliance on computers has increased, the demand to access computer resources from a variety of locations has increased as well. Conventionally, for example, a business user may have accessed resources on a corporate server through a desktop computer connected to the corporate server by a private, secure corporate network. Now, however, that user may wish to access the same corporate resources from a personal computer at home over a public network, such as the Internet. Still further, the user may wish to access those resources from a laptop computer while traveling. The connection to the corporate server computer might then be made over a publicly accessible wireless network connection in a hotel or coffee shop. In some instances, that user may even desire to access those corporate resources from a computer at a public kiosk.

In addition to accessing a resource on a remote computer from a variety of computing environments, the user may also employ a number of different communication and security techniques when accessing those resources. For example, a laptop provided by the same company maintaining the desired resources may have dedicated communication software installed. It may also have sophisticated security-related software, such as commercial anti-malware and anti-virus software. The same user's home computer, however, may only have some limited security-related software, such as residential anti-virus software. Also, it may communicate with the remote server computer using a browser application with additional "plug-in" software to enhance the browser's communication abilities. Still further, a computer at a public kiosk may have little or no security-related software, and provide only a basic browser software application for communicating with the remote server. Still further, a computer may access remote resources via communication channels secured using the Secure Socket Layers (SSL) protocol, the Hypertext Transfer Protocol Secure (HTTPS) protocol (which employs the Secure Socket Layers (SSL) protocol, or the Internet Protocol Security (IPSec) protocol on another computer.

Despite this wide variety of computing environments and associated variety of security risks now being used to access resources on remote computers, actual access to resources typically is predicated only on the user's identification. This identification may be direct, such as by credential information personally associated with the user, or indirect, such as credential information associated with a particular computer or copy of a software application. Thus, if a user can provide the proper credentials to authenticate his or her identity, the user can access authorized resources regardless of the type of resource being accessed or the security of the computing environment being used to access the resources.

BRIEF SUMMARY OF THE INVENTION

Various aspects of the invention can be employed to a user's access to resources on a remote computer based upon the computing environment of the computer or "end point" being employed by the user to obtain those resources. With some examples of the invention, for example, an analysis of the security of the user's computing environment determine whether the user is granted access to resources on a remote computer. Thus, authorization to access resources on a remote computer may be graded according to the current security state of the user's computing environment.

In other examples of the invention, an analysis of the communication software available to the user's computing environment may determine how resources on a remote computer are provided to the user. With still other aspects of the invention, a user may be provisioned with one or more process objects in order to enhance the user's computing environment. For example, the user's computing environment may be provisioned with one or more security objects deemed necessary to obtain requested resources from a remote computer.

BRIEF DESCRIPTION OF THE DRAWINGS

FIGS. 5A-5E illustrate user interfaces that may be provided to an administrator by a unified policy server according to various embodiments of the invention.

DETAILED DESCRIPTION OF THE INVENTION

Overview

Figure 1:
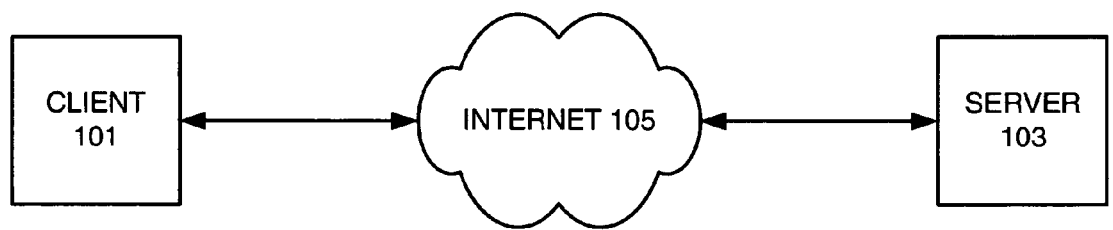
FIG. 1 shows one example of a conventional network.

As will be discussed in further detail below, various embodiments of the invention provide systems and techniques for controlling requests for resources from remote computers. More particularly, a remote computer's ability to access a resource will be determined based upon the computer's operating environment. With these embodiments, the computer (or computers) responsible for controlling access to a resource will interrogate the remote computer to ascertain its operating environment. The computer (or computers) responsible for controlling access to a resource may, for example, download one or more interrogator agents onto the remote computer to determine its operating environment. The interrogator agents may interrogate the remote computer regarding any combination of static artifacts residing on the remote computer and process objects, including active processes and agents. The interrogator agents may, for example, interrogate the remote computer regarding security process objects, such as anti-virus agents, communication process objects, such as agents used to establish or maintain a virtual private network, or both.

In addition to passively interrogating the remote computer, with some embodiments of the invention the computer (or computers) responsible for controlling access to a resource may additionally provision the remote computer with process objects. For example, the computer (or computers) responsible for controlling access to a resource may require a remote computer to have a specific portfolio of process objects in order to access the resource. In some embodiments, this portfolio may vary depending upon the identity of the person using the remote computer to access the resource. If the interrogation process determines that the remote computer does not possess the required portfolio of process objects, then the computer (or computers) responsible for controlling access to the resource may provision the remote computer with the missing process objects. Some embodiments of the invention may additionally provision and install an installation agent to facilitate the subsequent installation of process objects.

While various embodiments of the invention may use any number of interrogator agents, some embodiments of the invention will use two interrogator agents: an interrogator agent that is employed before authenticating the identity of the remote computer's user, and an interrogator agent that is employed after authenticating the identity of the remote computer's user. With these embodiments, the pre-authentication interrogator agent may interrogate the remote computer for artifacts. Based upon the determined artifacts, the computer (or computers) responsible for controlling access to a resource may provision the remote computer with on or more process objects, such as security process objects useful to protect the user's credential information during the authentication process.

The post-authentication interrogator agent can then interrogate the remote computer for additional artifacts, process objects, or a combination of both. Depending upon the interrogation results (and any additional provisioning of process objects), the computer (or computers) responsible for controlling access to a resource may determine whether the remote computer may access that resource. Alternately or additionally, they may determine the communication mechanism used to access the resource.

Client/Server Configuration

Various embodiments of the invention will typically be employed to facilitate cooperation between a client and one or more servers. As known in the art, a client/server configuration (including a Web based architecture configuration) occurs when a computing device requests the use of or access to a resource from another computing device. For convenience and ease of understanding hereafter, requests to use, obtain, or otherwise access a resource may generically be referred to simply as "requesting" a resource, while using, obtaining, or otherwise accessing a resource may generically be referred to simply as "obtaining" a resource.

Because the computing device responsible for providing the resource "serves" the computing device initially requesting the resource, the computing device responsible for providing the resource is often referred to as a "server." The computing device requesting the resource is then commonly referred to as a "client." Also, because a request for resources and the delivery of those resources may be relayed among a variety of computing devices having a client/server relationship, the client computing device initially requesting the resource is commonly referred to as the "end point" client.

FIG. 1 illustrates a conventional relationship between a client 101 and a server 103. As seen in this figure, the client 101 may transmit the request for one or more resources to the server 103 over a network 105. The network 105 may be a private network, such as an intranet, or a public network, such as the Internet. The server 103 may then provide the client 101 with the requested resources over the network 105.

It should be noted that, as used herein, a server may be considered a virtual device rather than a physical device. For example, the functions of the server 103 may be performed by a single computing device. Alternately, the functions of the server 103 may be performed by a group of computing devices cooperating together. Similarly, a client may be considered a virtual device. That is, one or more separate computing devices can cooperate together to function as a client. In many situations, a client may work with multiple servers in order to obtain a resource. For example, a client may submit the request for a resource to a first server, which may then relay the request to a second server. The second server may authenticate the identity of the client (or a user employing the client), to determine whether the client should be permitted may access or use the requested resource. Yet another server may then actually provide the resource to the client.

As used herein, a resource may be any type of object or service available through a server. For example, the resource may be a data file or a directory of data files. The resource may also be a service, such as an electronic mailing service, a database service, a document management service, a remote shell or terminal service, or the like.

Example Computing Device

Various embodiments of an end point control server system according to the invention may be implemented using electronic hardware. More typically, however, the various features of the invention will be implemented by executing software instructions on a programmable computing device or computer. Accordingly, FIG. 2 shows one example of a computer 201 that can be used to implement various aspects of the invention.

Figure 2:
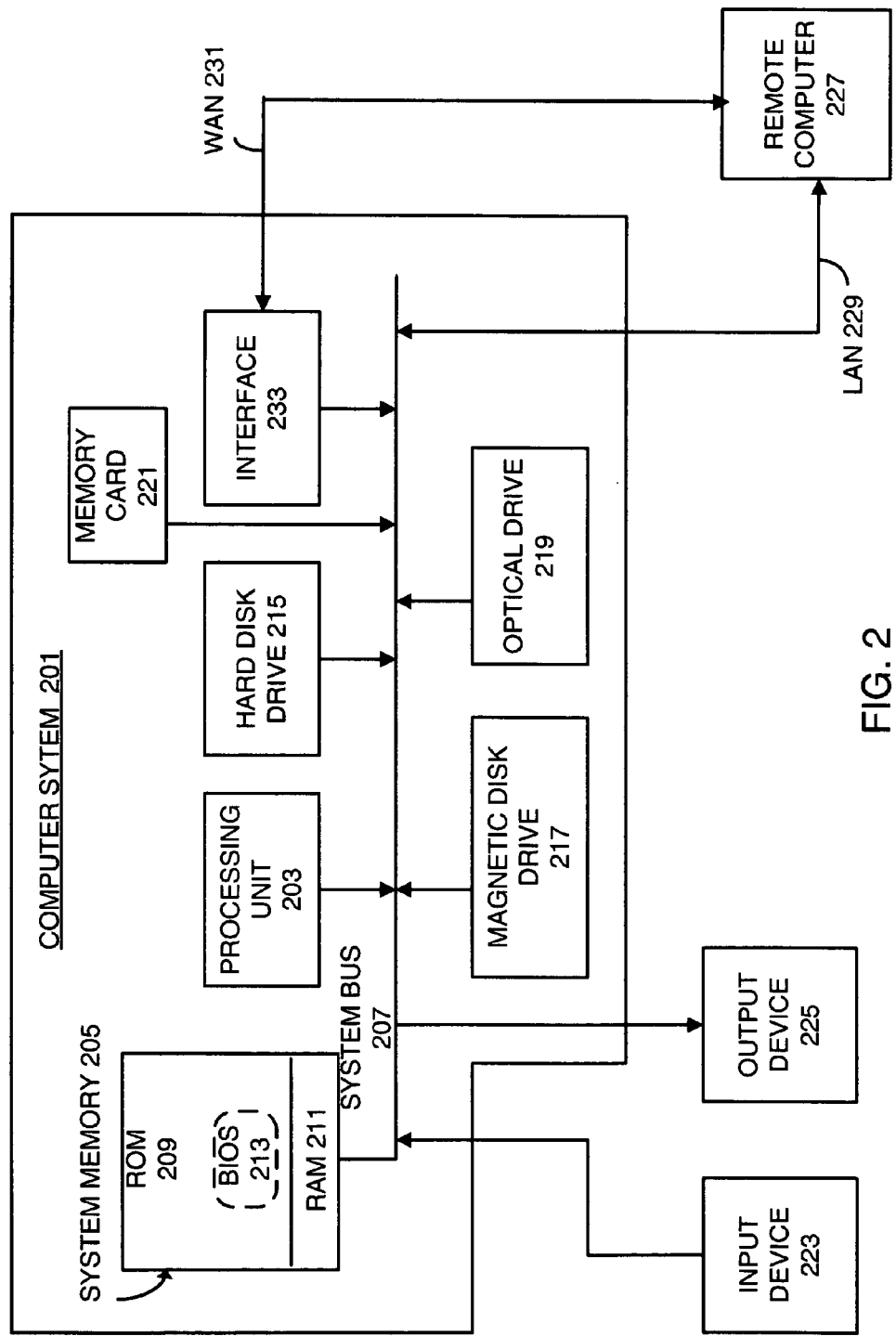
FIG. 2 shows an example of a computing device that can be used to implement a network appliance according to various examples of the invention.

The computer system 201 illustrated in FIG. 2 includes a processing unit 203, a system memory 205, and a system bus 207 that couples various system components, including the system memory 205, to the processing unit 203. The system memory 205 may include a read-only memory (ROM) 209 and a random access memory (RAM) 211. A basic input/output system 213 (BIOS), containing the routines that help to transfer information between elements within the computer system 201, such as during startup, may be stored in the read-only memory (ROM) 209. If the computer system 201 is embodied by a special-purpose "server application" computer system 201, it may further include, for example, another processing unit 203, a hard disk drive 215 for reading from and writing to a hard disk (not shown), a magnetic disk drive 217 for reading from or writing to a removable magnetic disk (not shown), or an optical disk drive 219 for reading from or writing to a removable optical disk (not shown) such as a CD-ROM or other optical media.

A number of program modules may be stored on the ROM 209, the hard disk drive 215, the magnetic disk drive 217, and the optical disk drive 219. A user may enter commands and information into the computer system 201 through an input device 223, such as a keyboard, a pointing device, a touch screen, a microphone, a joystick or any other suitable interface device. Of course, the computer system 201 may simultaneously employ a variety of different input devices 223, as is known in the art. An output device 225, such as a monitor or other type of display device, is also included to convey information from the computer system 201 to the user. As will be appreciated by those of ordinary skill in the art, a variety of output devices 225, such as displays, speakers and printers, may alternately or additionally be included in the computer system 201.

In order to access other computing devices, the computer system 201 should be capable of operating in a networked environment using logical connections to one or more remote computing devices, such as the remote computing device 227. The computer system 201 may be connectable to the remote computer 227 through a local area network (LAN) 229 or a wide area network (WAN) 231, such as the Internet. When used in a networking environment, the computer system 201 may be connected to the network through an interface 233, such as a wireless or wired network interface card (NIC) or similar device. While the interface 233 is illustrated as an internal interface in FIG. 2, it may alternately be an external interface as is well known in the art. Of course, it will be appreciated that the network connections shown in this figure are for example only, and other means of establishing a communications link with other computers may be used.

An End Point Control Server System

Figure 3:
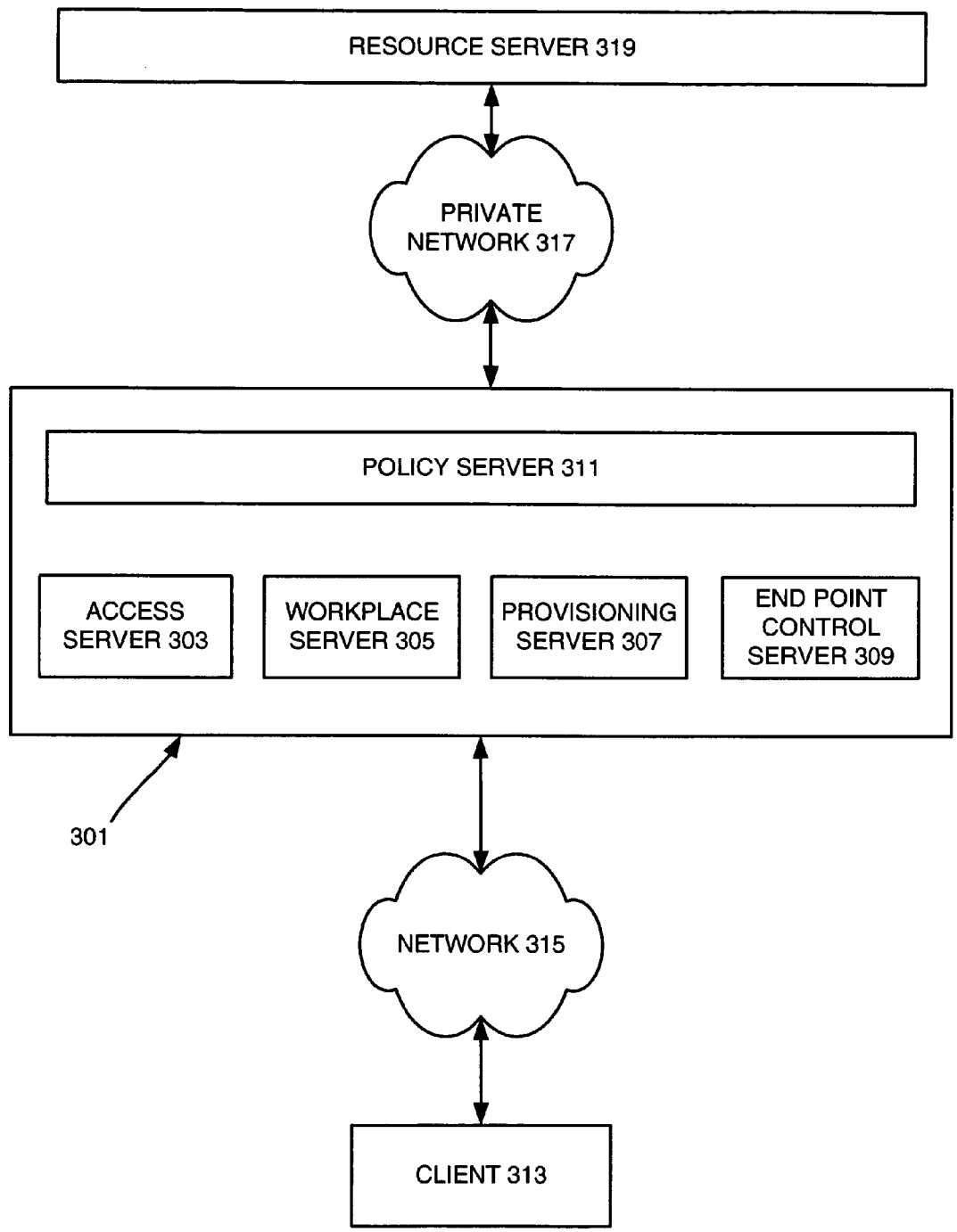
FIG. 3 shows an example of a server system that may be employed according to various examples of the invention.

FIG. 3 illustrates one example of a server system 301 that may be used to implement various embodiments of the invention. As seen in this figure, the server system 301 includes an access server 303, workplace server 305, a provisioning server 307, an end-point-control (EPC) server 309, and a policy server 311. FIG. 3 also illustrates a client 313, which communicates with the access server 303 through a network 315. Typically, the network 315 will be a public network, such as the Internet. With some implementations of the invention, however, the network 315 may be a private network, such a corporate or institutional intranet. The client 313 may be implemented by any suitable computing device or combination of computing devices. For example, the client 313 may be a programmable computer, such as the programmable computer 201 described above. The computer may be, for example, a personal desktop computer, a laptop computer, or even a personal digital assistant or "smart" telephone.

As employed herein, the term "user" will refer to the individual using the client 313 (or other client) to obtain resources from the server system 301. For some applications of the invention, the client 313 may be implemented on a computing device owned by its user or by the same corporation or institution maintaining the server system 301 (or by a related corporation or institution). With still other applications of the invention, the client 313 may be implemented on a computing device owned by a third party, and may even be provided in a publicly available kiosk.

As will be discussed in greater detail below, the client 313 transmits requests to the access server 303 for the use of or access to one or more resources provided through the workplace server 305. With various embodiments of the invention, the client 313 may request one or more resources from the workplace server 305 through a secure communication channel. For example, the client 313 may seek to establish a secure communication channel using any desired conventional security protocol, such as the Secure Socket Layers (SSL) protocol, the Hypertext Transfer Protocol Secure (HTTPS) protocol, (which employs the Secure Socket Layers (SSL) protocol), the Internet Protocol Secure protocol (IPSec), the SOCKet Secure (SOCKS) protocol, the Layer Two Tunneling Protocol (L2TP), the Secure Shell (SSH) protocol, or the Point-to-Point Tunneling Protocol (PPTP). Further, the client 313 may seek to establish a secure communication channel using a secure remote computer connection technique, such as Windows Remote Desktop, Citrix, Virtual Network Computing (VNC) or other "screen-scraping" technology.

The Workplace Server

It also should be noted that the workplace server 305 shown in FIG. 3 is merely representative of any combination of servers that can provide a requested resource. Thus, the workplace server 305 may be any server or combination of servers responsible for providing one or more resources to clients. For example, the workplace server 305 may be an electronic mail server, a server that maintains a database, a print server, a data storage server, a file or document management server, a Voice over Internet Protocol (VoIP) server, a remote shell or terminal service or the like. With some implementations, the workplace server 305 may only be indirectly responsible for providing requested resources. For example, the workplace server 305 may be a proxy server providing a connection to another server 319 through, for example, a private network 317, which will actually provide requested resources to the client 313. Thus, the resource being sought by the user over the network does not have to be in physical or logical proximity to the workplace server 305. It also should be appreciated that the workplace server 305 may be responsible for providing a variety of different types of resources, including any combination of data files and services.

The Access Server

The access server 303 may be any device or combination of devices that provides a gateway to the remainder of the server system 301 or other resource servers 319. Typically, the access server 303 will be responsible for establishing both secure and unsecured communication channels with the client 313. For example, as known in the art, the client 313 may use an unsecured communication channel to contact the access server 303. The access server 303 may then respond to the client 313 that the client 313 needs to establish a secure communication channel and the manner in which this may be done. In reply, the client 313 will request that the access server 303 establish a secure communication channel for the client 313 to obtain the requested resource. The access server 303 can then use an encrypted communication protocol, to create a secure communication channel between the client 313 and the server system 301.

It also should be noted that, in some applications of the invention, the client 313 will contain special-purpose software for establishing a secure connection with the server system 301 through the access server 303. For example, the access server 303 may be configured to cooperate with software resident on the client 313 to create a Virtual Private Network (VPN) secure communication session between the client 313 and the server system 301 using secure encryption communication protocols, such as the Secure Sockets Layer (SSL) protocol or the Internet Protocol Secure (IPSec) protocol. With other applications, a user may employ a general purpose software application on the client 313, such as a browser application, to establish a secure connection to the server system 301 through the access server 303. For example, a user may attempt to employ a browser application on the client 313, such as the Microsoft Internet Explorer or Mozilla, to access a Universal Resource Locator (URL) address in the server system 301. The access server may therefore be configured to use appropriate secure communication protocols, such as the Secure Hypertext Transfer Protocol (HTTPS), to establish secure communication with a client 313 using such a general purpose software application. Accordingly, the access server 303 may include multiple components or be comprised of multiple servers for handling multiple communication techniques.

In some embodiments of the invention, the access server 303 may maintain the secure communication channel with the client 313. With other embodiments of the invention, however, the access server 303 may simply establish the secure communication channel. It may then pass off responsibility for maintaining and administering the secure communication channel to another server, such as the workplace server 305.

The Policy Server

The policy server 311 determines the conditions under which a user of the client 313 may obtain the requested resources. More particularly, as will be explained in detail below, the policy server 311 administers policy rules specifying the conditions under which a user may obtain a requested resource. With various embodiments of the invention, these conditions may include both the identity of the user and the operating environment of the client 313. With various embodiments of the invention, the policy server 311 also may validate authentication credentials submitted by a user with a request to obtain resources from the server system 301. As used herein, the term "administrator" will refer to a person authorized to configure policy rules for enforcement by the policy server 311.

Figure 4:
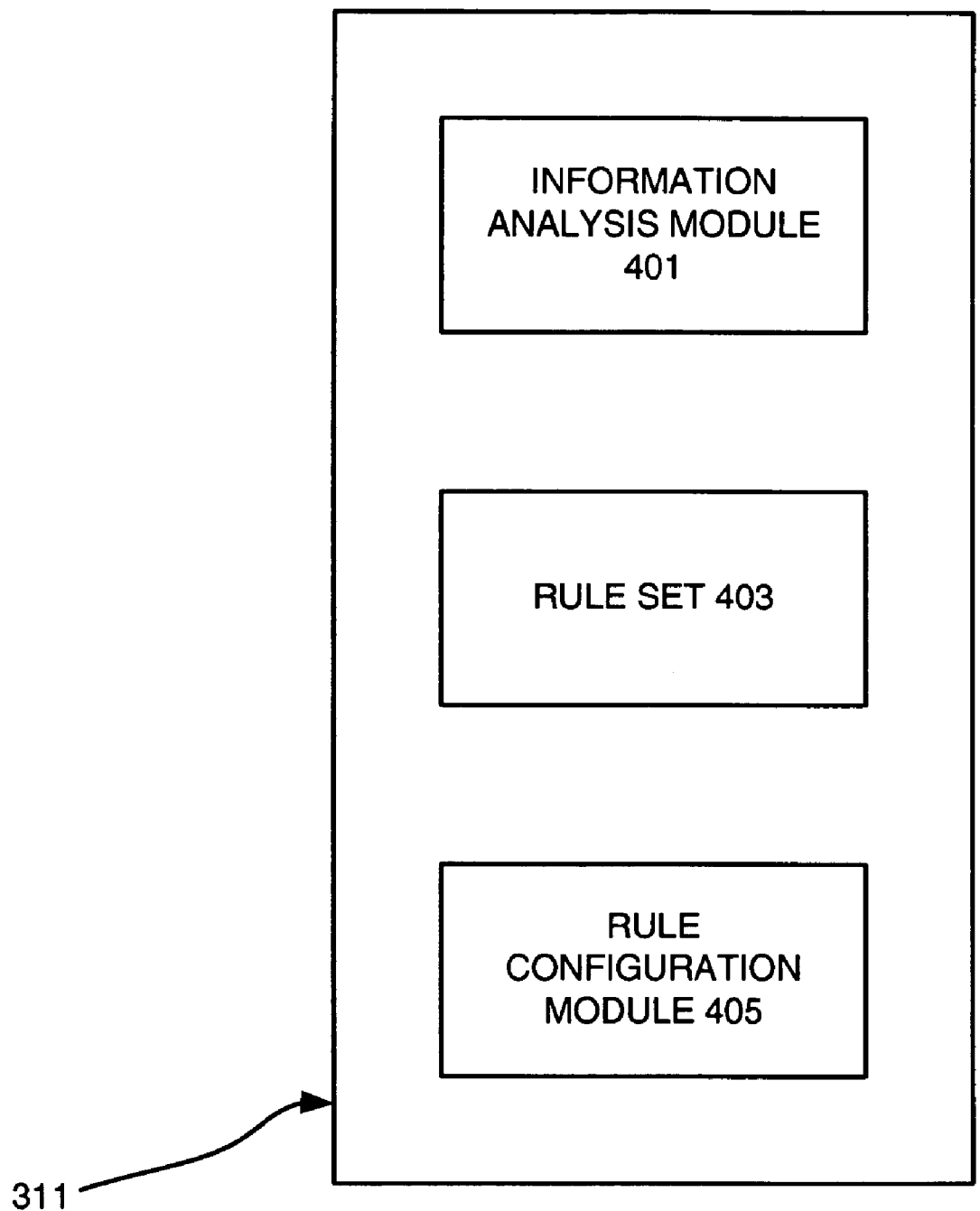
FIG. 4 shows the components of policy server according to various examples of the invention.

As shown in FIG. 4, the policy server 311 includes a credentials and profile information analysis module 401. It also includes a rule set 403, and a rule configuration module 405. As will be discussed in further detail below, the credentials and profile analysis module 401 receives credential and profile information regarding a user requesting to access or use resources on the client computer 313. The credentials and profiles analysis module 401 then compares this received information with rules in the rule set 403, to determine if the requested access should be granted. With various embodiments of the invention, the credentials and profiles analysis module 401 may also require some action from the client computer 313 based upon requirements specified in the rule set 403. The rule configuration module 405 then provides the server system administrator with a user interface for configuring and revising rules in the rule set 403.

The access server 303 may support a variety of different communication techniques by which the client 313 may securely communicate with the server system 301, as noted above. Accordingly, with various embodiments of the invention an administrator may employ the policy server 311 to implement a single access control policy for multiple communication techniques provided by the access server 303.

Figure 5C:
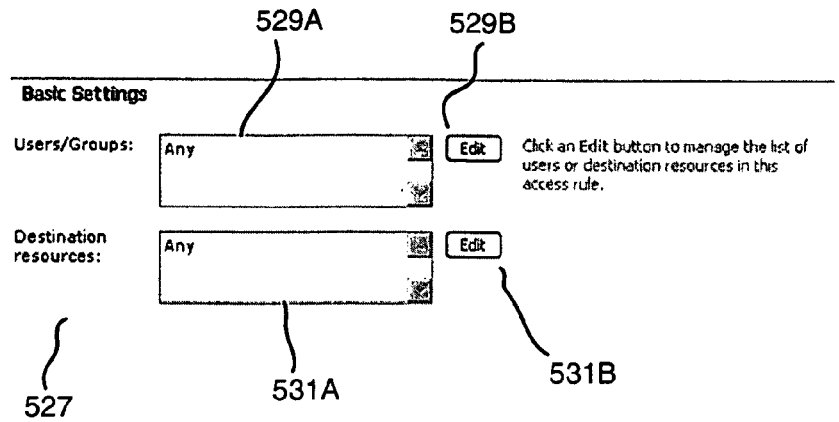

FIGS. 5A-5E illustrate examples of user interfaces that such a unified policy server 311 may provide to an administrator according to various embodiments of the invention. In particular, FIG. 5A illustrates a user interface 501 that may be provided by the policy server 311 to display existing rules according to various embodiments of the invention. As seen in this figure, the user interface 501 displays a list of rules (sometimes refereed to as "access control list" (ACL) rules) that have been configured for controlling access to one or more resources accessible through the server system 301.

The entry for each rule may include, for example, a selection check box 503, a rule number 505, and an action indicator 507. The selection check box 503 can be used to select the associated rule in order to, for example, delete or reorder the rule. The rule number then indicates the order in which the rule will be evaluated. With various embodiments of the invention, the rule number may also serve as an edit command control that the administrator can activate when he or she wishes to edit the rule. The action indicator then indicates the function of the rule. For example, a green action indicator may be used to indicate that the rule will permit access to the associated resource for a compliant user, while a red action indicator may be used to indicate that the rule will prohibit access to an associated resource for a compliant user.

A rule may also include a description 509, a user identification 511, a destination 513, a communication method indicator 515, and a zone indicator 517. The description indicator 509 can be used by the administrator to provide a convenient description of the function and/or applicability of the rule. The user indicator then indicates the users to which the rule applies. For example, an administrator may designate that a rule applies to one or more specific users, one or more particular communities, one or more particular realms, or any combination of these. Alternately, the administrator may designate the rule to be applicable to any user. The destination indicator 513 is then associated with the resource being controlled by the rule. With some embodiments of the invention, the destination indicator 513 may indicate the location in the server system through which the resource may be accessed. With still other embodiments of the invention, however, the destination indicator 513 may identify the resource itself.

The communication method indicator 515 indicates the particular type of communication method to which the rule will be applied. As will be discussed in detail below, various embodiments of the invention provide multiple communication techniques for establishing a secure communication session between the client 313 and the server system 301. As will be appreciated by those of ordinary skill in the art, some communication techniques will be more inherently secure than others. Accordingly, a rule can be configured to specify its applicability to one or more particular communication techniques. Advantageously, as described herein, various embodiments of the invention allow an administrator to designate rules for all communication techniques using a unified set of user interfaces provided by a single rule configuration system. Lastly, the zone indicator indicates the zone in which the operating environment of the client 313 must be classified in order to comply with the requirements of the rule.

FIG. 5B illustrates a portion 519 of a user interface that may be provided by the policy server 311 to edit or create an access control rule for unified application over different communication techniques, according to various embodiments of the invention using the. As seen in this figure, this user interface portion 519 includes a number control 521, a description control 523, and a series of action controls 525. The number control 521 is used to specify the number for the rule (i.e., the order in which the rule will be applied to a client). The administrator can then use the description control 523 to enter a useful description of the purpose or intent of the purpose or application of the rule.

The action controls 525 allow the administrator to specify the action that the rule will take if a client 313 complies with the requirements of the rule. For example, if the administrator selects the "permit" action control 525, then the client 313 will be permitted to access the associated resource upon compliance with the rule. Similarly, if the administrator selects the "deny" action control 525, the client 313 will be denied access to the resource if the policy server determines that the client is in compliance with the provisions of the rule. An administrator can then select the "disabled" action control in order to disable the rule.

FIG. 5C illustrates another portion 527 of a user interface that may be provided by a policy server 311 to allow an administrator to edit or create a rule according to various embodiments of the invention. This user interface portion 527 includes a user group control 529A, and a user group edit command control 529B. It also includes a destination resources control 531A and a destination resources edit command control 531B. When configuring a rule, the administrator may select the individual users, a group of users (such as a community or realm of users), or a combination of both to which the rule will be applied. Accordingly, the administrator may activate the user edit command control 529B to obtain a list of available users and/or groups of users. The administrator can then select from the list in order to designate a selected user or group to appear in the user control 529A.

Similarly, when configuring a rule, the administrator must designate the resource whose access will be controlled by the rule. The administrator may therefore activate the destination resource edit command control 531B to obtain a list of resources available through the server system 301. The administrator may then select from this list in order to specify the resources will be included in the destination resources control 531A, to which the rule will be applied.

Figure 5D:
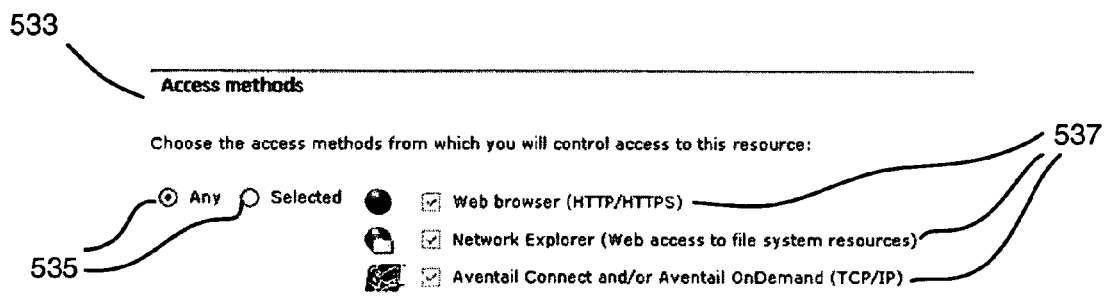

FIG. 5D illustrates still another portion 533 of a user interface that may be provided by a policy server 311 to edit or create a rule. As seen in this figure, the user interface portion 533 includes a first set of communication technique selection controls 535, and a second set of communication technique selection controls 537. The first set of selection controls 535 allow an administrator to easily choose between applying a rule to all supported communication techniques, or choosing to selectively apply the rule to one or more specific communication techniques. If the administrator chooses to apply the rule to specific communication techniques, the administrator can then select among the communication technique selection controls 537 to specify one or more particular communication techniques for which the rule will be applied.

Figure 5E:
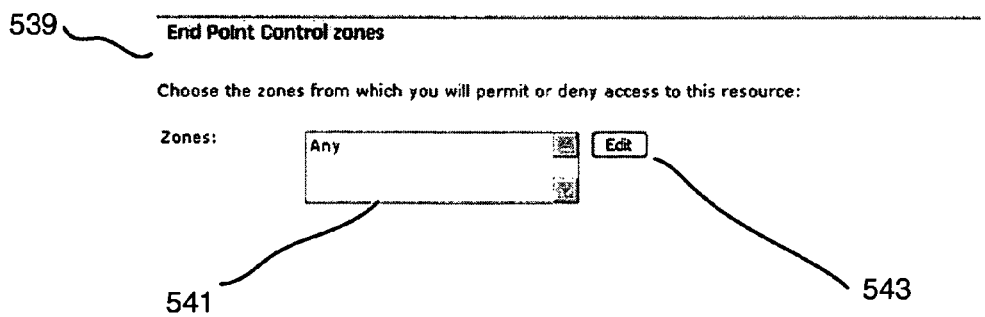
Figure 6A:
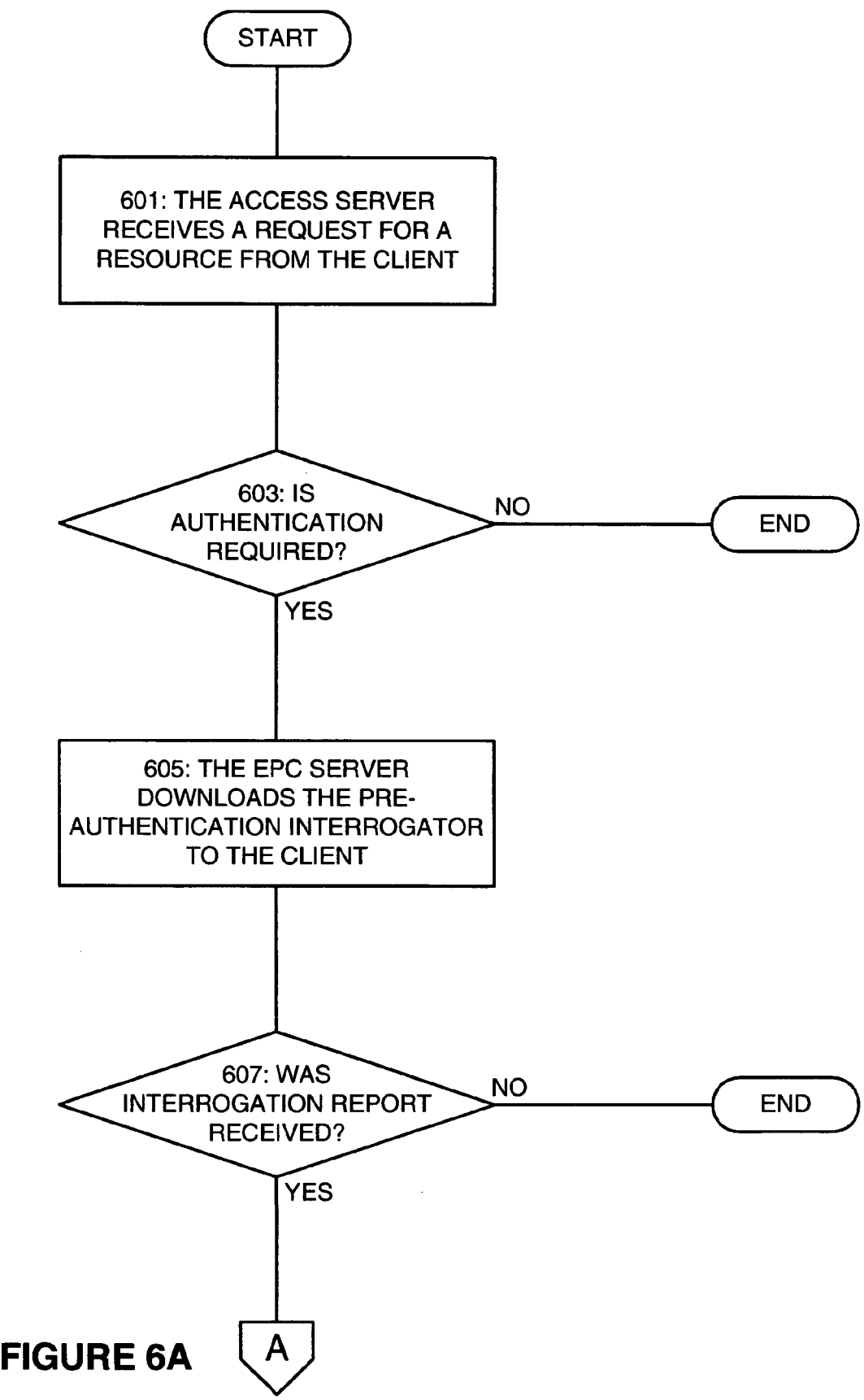
FIGS. 6A-6E illustrate a flowchart describing a method of controlling access to a resource according to various embodiments of the invention.
Figure 6B:
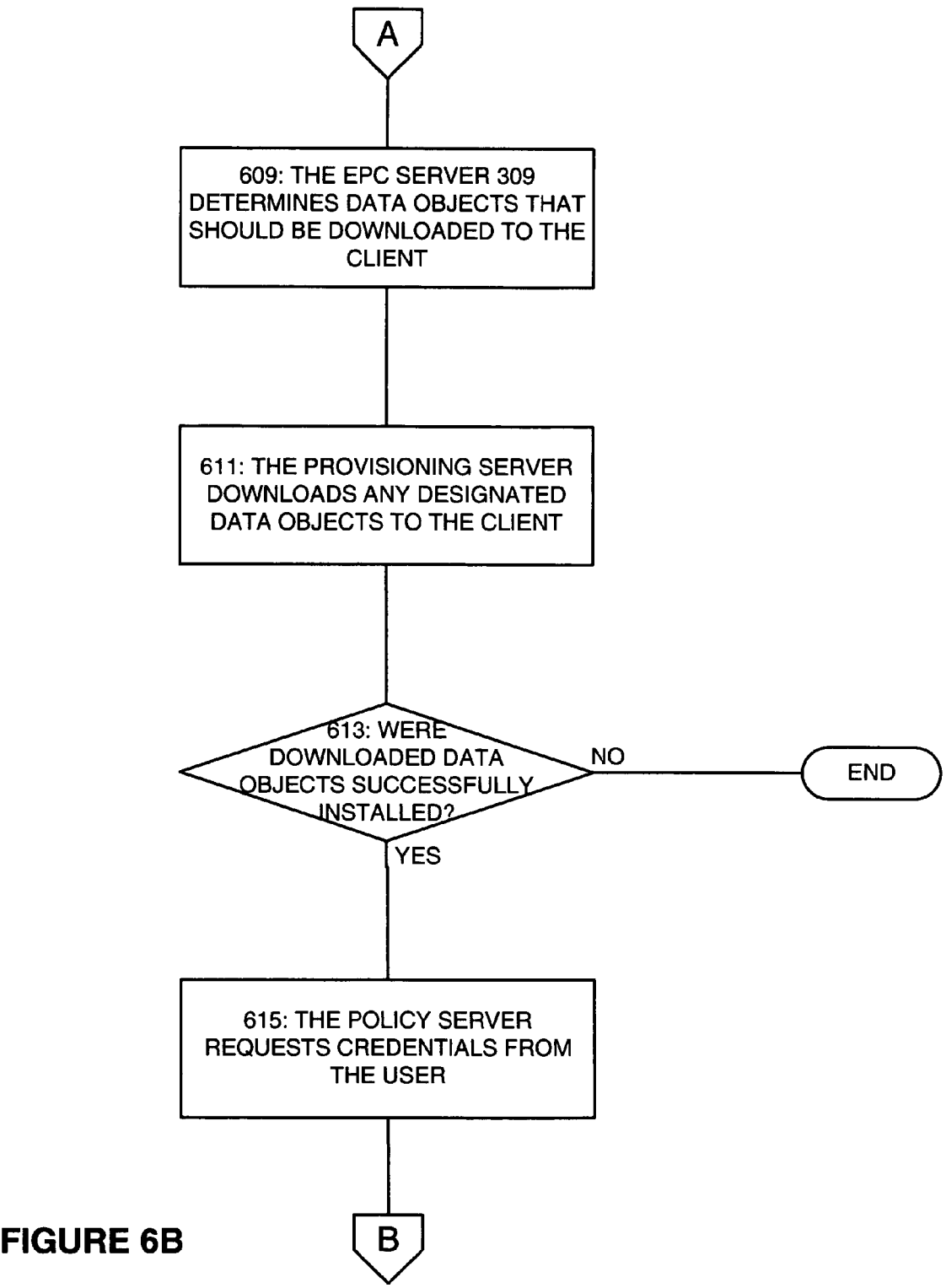
Figure 6C:
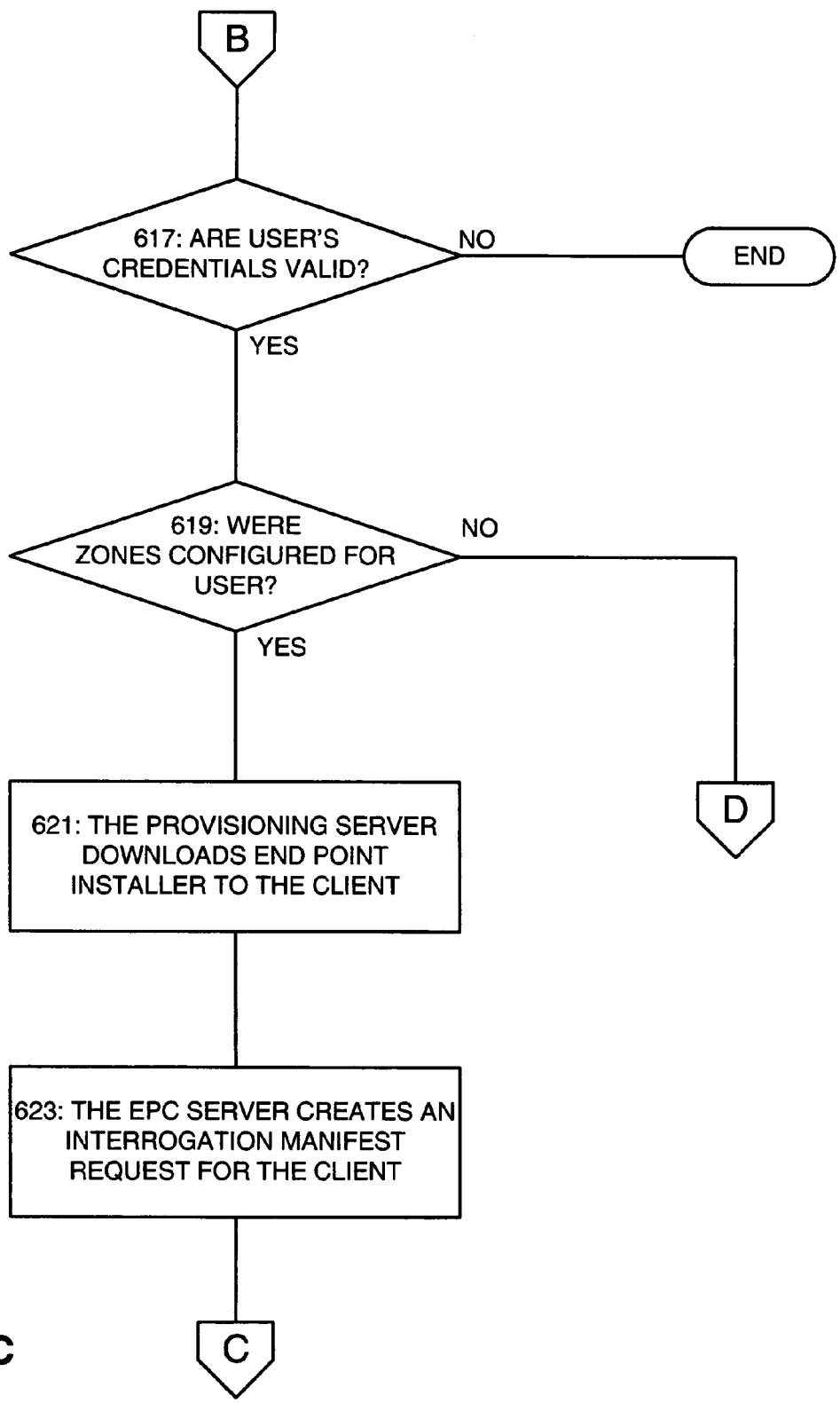
Figure 6D:
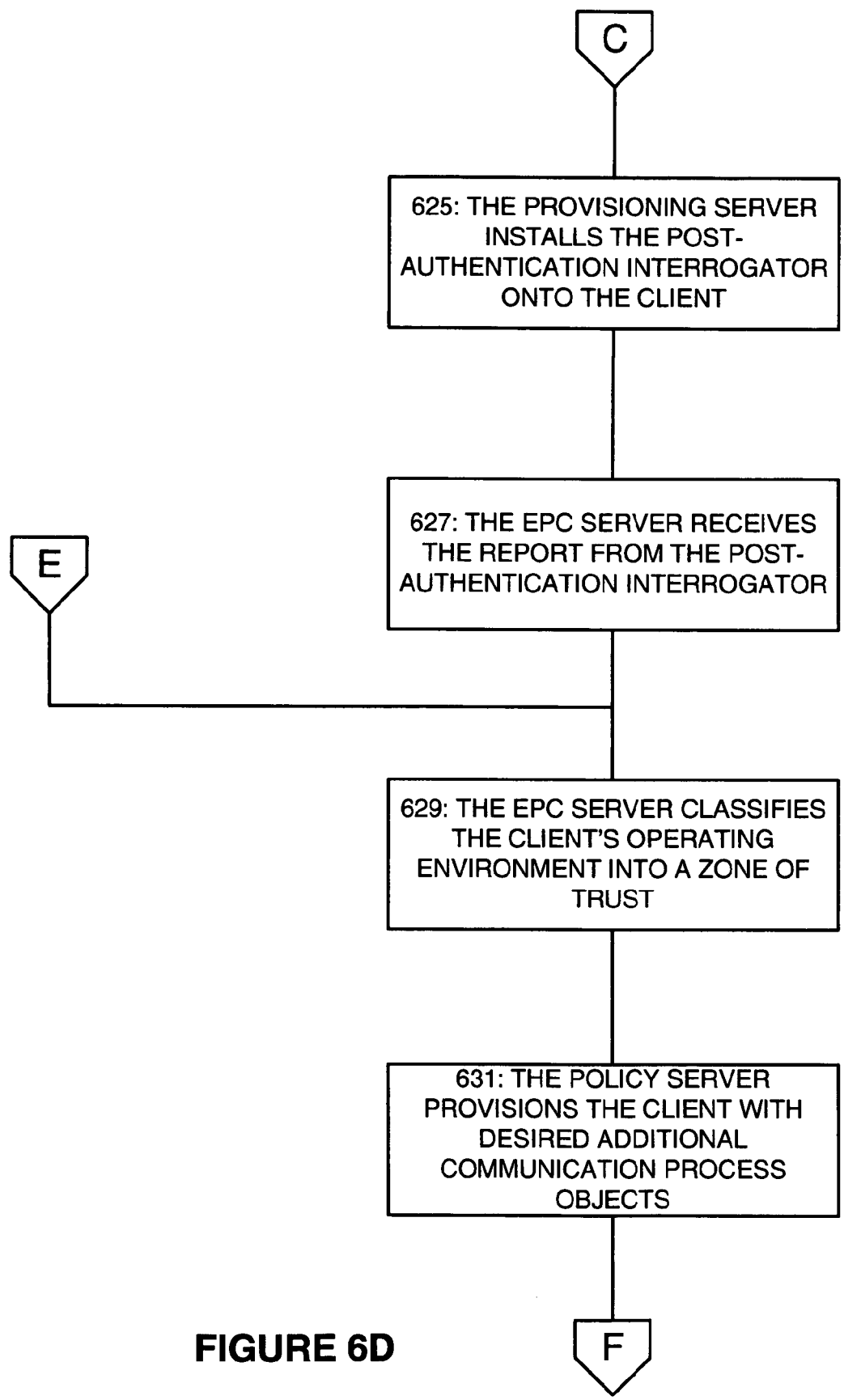
Figure 6E:
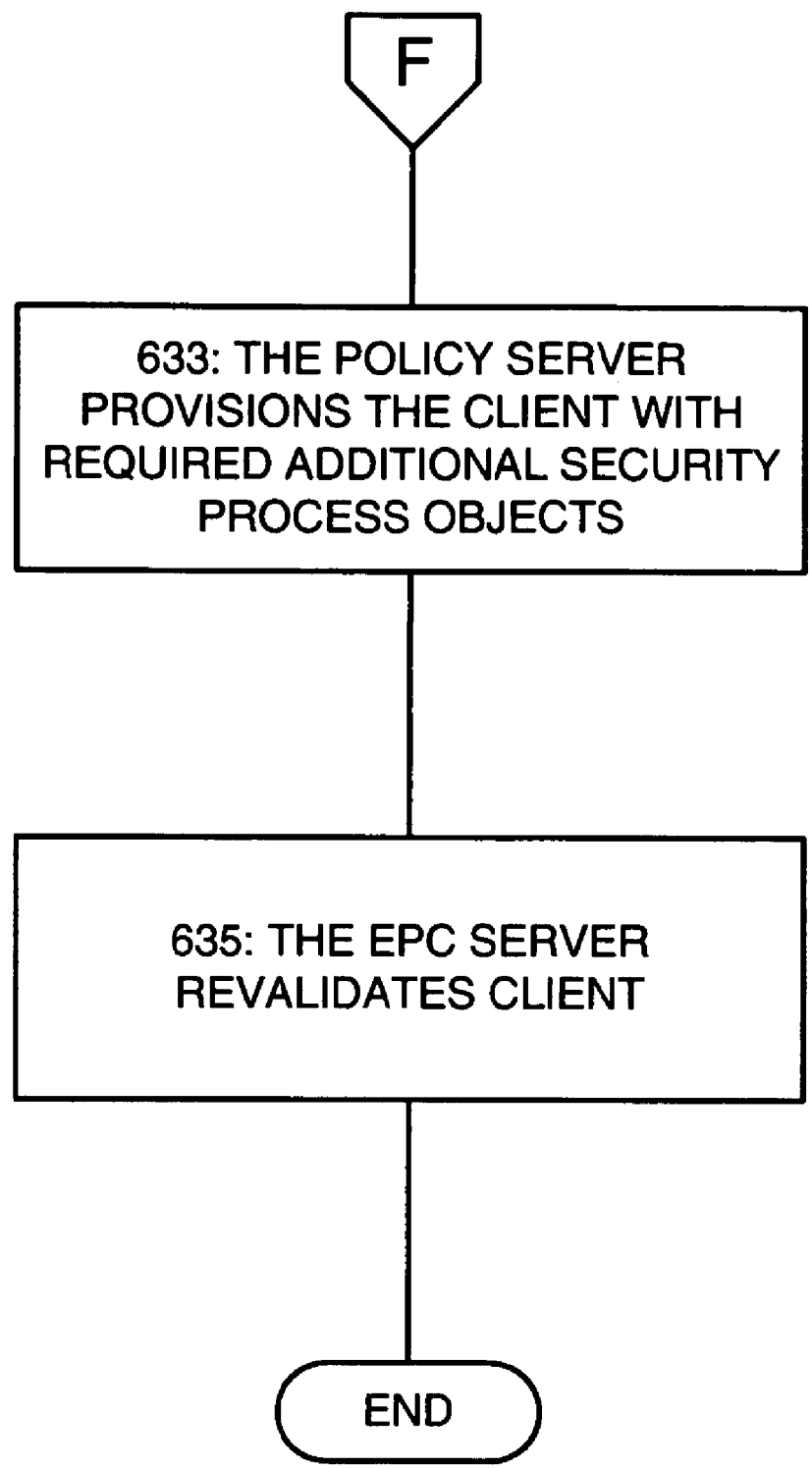

FIG. 5E then illustrates a user interface portion 539 that may be provided by various embodiments of the policy server 311 to create or edit a rule. The user interface portion 539 includes a zone selection control 541 and a zone selection edit command control 543. If the administrator wishes the rule to apply only when the client's operating environment complies with one or more particular zones of trust, the administrator can activate the zone selection edit command control to, for example, view a list of available zones of trust that have already been defined. The administrator can then select one or more zones of trust from this list to include those zones of trust in the zone selection control 541. The zones of trust specified in the zone selection control 541 will then be included in the edited or new rule.

The Provisioning Server and the End Point Control Server

The provisioning server 307 and the EPC server 309 assist the policy server 311 to enforce the access rules. For example, the provisioning server 307 and the EPC server 309 cooperate to interrogate the client computer 313 to detect the presence of desired process objects. Further, depending upon the rules specified in the rule set 403, the provisioning server 307 and the EPC server 309 may cooperate to install and activate desired process objects on the client computer 313. For example, if a rule requires that the client 313 have a specific portfolio of security process objects installed and operational, then the provisioning server 307 and the EPC server 309 may cooperate to install and activate one or more of those security process objects on the client 313. Also, with some embodiments of the invention, the provisioning server 307 and the EPC server 309 can determine if the client 313 is capable of executing a communication process object that will implement a more preferred or alternate communication technique. With these embodiments, the provisioning server 307 and the EPC server 309 may cooperate to install and activate one or more such communication process objects on the client device 313.

The security objects may be any software such as, for example, anti-malware or anti-virus agents. As used herein, the term "malware" generally will refer to software agents or processes that are intended to obtain information for illicit purposes. The term "virus" will then generally be used to refer to software agents or processes intended to damage data or obstruct the operation of the host computer. It should be appreciated, however, that these terms should not be construed as limiting, since many software agents and processes may both obtain information for illicit purposes and damage data or obstruct the operation of the host computer. The security objects may also include client certification agents, client integrity agents, client inventory agents, data protection agents, patch management agents, personal firewall agents, system audit agents, and vulnerability assessment agents. Still further, with various embodiments of the invention, the provisioning server 307 and the EPC server 309 can cooperate to check for and/or install any desired security object on the client computer 313.

Security Zones

As noted above and as will be discussed in detail below, a policy rule may determine the availability of a resource based upon the identity of the user and the operating environment of the client 313. In order to allow an administrator to simultaneously specify a variety of client operating environments for a rule, multiple client operating environments may be categorized into a "zone of trust." Accordingly, a policy rule may specify that a user may access a resource when his or her client operating environment can be categorized into zone of trust 1 or zone of trust 2, but will be refused access if his or her client operating environment is categorized into zone of trust 3. Another policy rule may then specify that a different user, user B, can only obtain that same resource if his or her client operating environment is categorized in zone of trust 1.

Accordingly, the provisioning server 307 and the EPC server 309 cooperate to interrogate a client's operating environment, and if necessary, to change a client's operating environment by provisioning the client 313 with specified security objects. With various embodiments of the invention, however, the provisioning server 307 and the EPC server 309 may split the interrogation and provisioning process into two stages. One stage will be performed before the user authenticates his or her identity, and the second stage will then be performed after the use has authenticated his or her identity.

This approach advantageously allows the provisioning server 307 and the EPC server 309 to ensure that the client 313 is provisioned with specified anti-malware agents or other desired agents before the authentication process begins. The specified anti-malware agents will then prevent malware from illicitly obtaining the user's credentials during the authentication process. Moreover, by provisioning the client 313 in stages, the provisioning server 307 and the EPC server 309 can avoid unnecessary provisioning steps if, for example, the user's credentials are not accepted during the authentication process.

Various embodiments of the invention may therefore factor the client operating environment required before the authentication process begins and the client operating environment required after the authentication process has been completed in determining the zone of trust into which the client computer will be categorized. Moreover, by partitioning the criteria for a zone of trust into pre-authentication requirements and post authentication requirements, various embodiments of the invention can customize the process for determining the post authentication requirements based upon the user's identification obtained during the authentication process. Accordingly, the tools employed to interrogate the user's client regarding its operating environment can be varied based upon the identity of the user.

The state of the client's operating environment when requesting a resource is referred to as the client's "signature." This signature is a list of pre-existing static process objects or "artifacts" on the client 313. The signature may also include processes or "agents" running on the client 313. The information in the signature can be used to determine the identity of the client 313.

For example, an administrator for a corporate-managed server system 301 may expect all corporate-owned computers to be configured with a particular set of artifacts and agents. Likewise, the administrator may expect a responsible employee to ensure that his or her personal computer is configured with a different set of particular artifacts and agents. On the other hand, the administrator may expect a computer provided in a public kiosk to have only a minimal set of artifacts and agents. Accordingly, the EPC server 309 may use the signature of a client 313 to distinguish a corporate-owned computer from a personal computer owned by an employee of the company from a computer at a public kiosk. The identity inherently provided by the signature may then subsequently used to classify the client 313 into a zone.

With various embodiments of the invention, a signature definition may be configured as a Boolean logic expression of "literal" values that conform to the standard Conjunctive Normal Form (CNF) (i.e. a conjunction of disjunctions). More particularly, a signature can be defined as a group of artifact literal values associated by the logical AND operator and one or more groups of agent literal values associated by the logical OR operator. The group of artifact literal values is then associated with the group (or groups) of agent literal values by a logical AND operator. Thus, for a client operating environment to match a particular signature, each artifact literal value must be TRUE and one agent literal value from each group of agents literal values also must be TRUE.

For example, if artifact literal A=ARTIFACT, agent literal PFW=Personal Firewall, agent literal AV=AntiVirus, agent literal CC=ClientCertification, and agent literal O=Other (for a yet to be defined agent type), a signature definition can then be expressed as:

Signature=A[1] && . . . && A[n_a] && (PFW[1]|| . . . ||PFW[n_pfw]) && (AV[1] || . . . ||AV[n_av]) && (CC[1]|| . . . ||CC[n_c]) && (O[1]|| . . . ||O[n_o])

For various embodiments of the invention, the artifact literals may include "DIR," where the value of this artifact literal will be a directory pathname to be found on client, "FILE," where the value of this artifact literal will be a file to be found on the client, and "REGISTRY," where the value of this artifact literal will be a KeyName to be found in the registry of the client. The artifact literals may also include "PROCESS," where the value of this artifact literal value is a running process to be found on the client, "DOMAIN," where the value of this artifact literal will be a domain of which the client is a member, and "OS," where the value of this artifact literal will be an operating system employed by the client.

The agent literals may include the "PFW_AGENT" literal and the "AV_AGENT" literal. The values of these agent literals will specify a particular instance of that agent. For example, the PFW_AGENT literal value "ZONE_PFW" may correspond to the Personal Firewall provided by Zone Labs Corporation. Thus, for a client 313 to have a signature matching a signature definition requiring this PFW_AGENT literal value, the Personal Firewall software application provided by ZONE ALARMS Corporation must exist and be running on the client 313. The PFW_AGENT literal value SYGATE_PFW may then correspond to the Sygate Personal Firewall software application, while the PFW_AGENT literal value "MS_PFW" may correspond to the Microsoft Personal Firewall software application. Similarly, the AV_AGENT literal value "MCAFEE_AV" may correspond to the McAfee Anti-Virus software application, while the AV_AGENT literal value "NORTON_AV" may correspond to the Norton Anti-Virus software application.

It should be noted, however, that this list of possible artifact and agent literals is one possible example, and should not be considered limiting. Various embodiments of the invention may provide any combination of desired artifacts and agents for inclusion in a signature definition. Still further, various embodiments of the invention may even allow an administrator to create define new artifact and agent literals as desired. Various embodiments of the invention also may allow an administrator to employ any combination of literal comparison operators in addition to the default equality comparison operator to define a signature, such as the literal comparison operators <, >, <=, >=, and !=. This permits, for example, the evaluation of the Microsoft Windows operating system registry entries during the authentication process.

With various embodiments of the invention, the policy server 311 may maintain a global list of signatures. An administrator can then select one or more signatures from this global list to define a zone of trust. While the precise configuration of the list structure will be implementation specific, the structure of one example of such a list is provided below.

---

1. GlobalListOfSignatures[0-∞]
   a. Signature
      i. Artifacts[0-∞]
      ii. PersonalFirewallAgents[0-∞]
      iii. AntiVirusAgents[0-∞]

---

A "zone of trust" or "zone" is an assertion of state on a client. As previously noted, the client state defining a zone of trust is a combination of the static and dynamic state existing on the client device prior to instantiating an authenticated secure communication session, (i.e., the signature), and the dynamic state added to the client during the lifecycle of the authenticated secure communication session. State assertions that are added to the client 313 during the authenticated secure communication session also are expressed as individual literals in a zone of trust definition. Like the signature definitions, a definition of a zone of trust may be created as a Boolean logic expression of literals that conform to the standard Conjunctive Normal Form (CNF).

With the illustrated embodiments of the invention, the definition of a zone of trust will first include one or more signature literal values. A signature literal value is true if the pre-authentication operating environment of the client 313 (i.e., its signature) matches the signature definition for that literal. The definition of a zone of trust may be expressed as a group of compound signature literals associated by the logical OR operator, followed by one or more groups of agent literals associated by the logical OR operator. Because the agent literals employed in this definition correspond to agents that are provisioned and/or after the authentication process, these agent literals are referred to below as "ADDED_AGENT" literals. The group of compound signature literals is associated with the group (or groups) of ADDED_AGENT literals by the logical AND operator. Accordingly, for a client operating environment to match a zone, one of the values of the signature literals must be TRUE. Also, one of the values in each group of the ADDED_AGENT literals also must be TRUE in order for the client operating environment to match a zone of trust definition.

For example, if signature literal S=SIGNATURE, agent literal DP=DataProtection, agent literal CI=ClientIntegrity, and agent literal O=other (representing a yet to be defined agent type), then the definition of a zone may be expressed as:

Zone=(S[1]|| ... ||S[n_s]) && (DP[1]|| ... ||DP[n_dp]) && (CI[1]|| ... ||CI[n_ci]) && (O[1]|| ... ||O[n_o])

The policy server 311 may provide literals for a variety of different types of agents. These agents may include, for example, anti-malware or anti-Trojan agents, anti-virus agents, client certification agents and client integrity agents. Anti-malware and anti-Trojan agents detect and protect against key-stroke loggers, back doors, remote hick jacking, spy-ware, and other processes intended to obtain information for illicit purposes. Anti-virus agents then detect and protect against viruses and other similar threats. Client certification agents determine the identity of a client device through a set of heuristics and/or cryptographic certification. Client integrity agents determine the integrity of the client device by performing multiple threat category functions rather than a single function.

The policy server 311 also may provide literals for client inventory agents, data protection agents, and patch management agents. Client inventory agents search for artifacts on the client. They may be used, for example, to determine the signature of the client. Typically, however, these agents will not be included in signature or zone of trust definition. Instead, one or more agents of this type are provisioned on the client in advance of determining a client's signature or zone of trust. Data protection agents protect data being used in authenticated secure communication sessions from being disclosed to parties other than the authenticated session user. Patch management agents manage client system patches, in order to ensure that, where possible, security holes have been repaired by software vendors.

Still further, the policy server 311 may provide literals for personal firewall agents, system audit agents, and vulnerability assessment agents. Personal firewall agents wall the client off from unauthorized network traffic and the associated threats of direct client system network attack and indirect network attack. System audit agents audit the compliance of end point security policy, while vulnerability assessment agents perform vulnerability scans of the client and assess its resistance to external threats.

The value of an agent will then correspond to a particular software application or other process. For example, a value of "ACC" for the data protection agent literal DP_AGENT will correspond to the Cache Cleaner software application available from Aventail Corporation of Seattle, Wash. Similarly, a value of "ASD" for the data protection agent literal DP_AGENT will correspond to the Aventail Secure Desktop software application also available from Aventail Corporation of Seattle, Wash. The value of "SSP" for the client integrity agent literal CI_AGENT will correspond to the Sygate Security Portal (also referred to as the Sygate On Demand product) available from Sygate Technologies of Fremont, Calif.

It should be noted, however, that this list of possible agent literals is one possible example, and should not be considered limiting. Various embodiments of the invention may provide any combination of desired agents for inclusion in a zone definition. Still further, various embodiments of the invention may even allow an administrator to create define new agent literals as desired. Various embodiments of the invention also may allow an administrator to employ any combination of literal comparison operators in addition to the default equality comparison operator to define a signature, such as the literal comparison operators <, >, <=, >=, and !=. This permits, for example, the evaluation of operating system registry entries, such as entries in the Microsoft Windows operating system registry, during the authentication process.

Moreover, it should be noted that the above-described definition of a zone is described with respect to embodiments of the invention that divide the interrogation process into a pre-authentication interrogation of the client's operating environment and a post-authentication interrogation of the client's operating environment. Various embodiments of the invention may alternately define a zone with any combination of artifact and agent literal values associated by any combination of logical operators and comparison operators.

Various embodiments of the policy server 311 may provide a global list of zones of trust for selection by an administrator. While the precise configuration of the list structure will be implementation specific, the structure of one example of such as list is provided below.

---
1. GlobalListOfZones[1-∞]
   a. Zone
      i. Signatures[0-∞]
         1. GlobalListOfSignatures[ordinal]
      ii. DataProtectionAgents[0-∞]
      iii. ClientIntegrityAgents[0-∞]
---

In addition to one or more zones of trust that specify a particular signature, the list of zones also typically will include a default zone that does not require a specific signature. Thus, if the client 313 fails to match any other zone of trust, its operating environment will be matched with this zone of trust by default. In various implementations of the invention, however, this zone of trust may still require that the client 313 be provisioned with one or more additional process objects.

With various embodiments of the invention, a user will be categorized into a "realm." As used herein, a realm is any group of one more users that is permitted to authenticate against a specific set of authentication servers, such as, for example, an LDAP authentication server, a Radius authentication, or an Active Directory authentication server. In order to allow an administrator to more conveniently associate a user with one or more zones, various embodiments of the policy server 311 may provide for the use of one or more "communities."

As used herein, a community is a group of one or more users within a realm that is associated with one or more defined zones. Thus, a community may be considered a subset instance of a realm authentication and authorization name space. With some applications of the invention, a community definition may have some additional usefulness outside of the scope of end point control. Accordingly, only the features of a community definition that relate to end point control will be discussed herein.

From the perspective of the EPC server 309, a community represents a configuration of zones of trust in the form of a scoped list, into which a specific authenticated user is authorized to be classified. As will be discussed in further detail below, after a user has authenticated his or her identity, the provisioning server 307 installs a post-authentication interrogator agent onto the client 313, in order to ascertain more information regarding the client's operating environment (e.g., to ascertain the remainder of the client's signature that was not discovered by the pre-authentication interrogator agent). The EPC server 309 can thus program this post-authentication interrogator agent with a specific manifest of artifacts to search for on the client 313 that correspond only to the zones of trust in which the user can be categorized. That is, the post-authentication interrogator agent will not need to search for the artifacts and agents included in every defined zone of trust; only for those zones of trust that are applicable to that user. The interrogation results returned from this post-authentication interrogator agent is then used to classify the user's client 313 into a specific zone of trust according to the Boolean logic previously described.

While the precise configuration of the structure of a community will be implementation specific, the structure of one example of a list of realms is provided below.

```
1. GlobalListOfRealms[1-∞]
    a. Realm
        i. Authentication servers [0-∞]
            1. GlobalListOfAuthenticationServers[ordinal]
        ii. ListOfUserCommunities[1-∞]
            1) User Community
                a) Members[1-∞]
                    i. User@Realm or Group@Realm
                b) Non End Point Control Related Elements
                c) .....
                d) .......
                e) ZoneOfTrust[0-∞]
                    i. GlobalListOfZones[ordinal]
                f) DefaultZone
```

Once the user of the client 313 has been authenticated and the client operating environment has been categorized into a zone of trust, the policy server 311 will determine whether the client 313 may obtain a particular resource based upon a policy rule. With various embodiments of the invention, the makeup and use of policy rules may have some additional usefulness outside the scope of end point control. Accordingly, only the features of a realm definition that relate to end point control will be discussed herein.

From the perspective of the EPC server 309, a policy rule represents the enforcement mechanism of a zone of trust. That is, in order for the client operating environment to be factored into a security policy, it must be associated with a policy rule. With various embodiments of the invention, this association is made with the use of a zone of trust literal. More particularly, when a zone of trust literal is encountered during evaluation of a policy rule, the currently classified zone of trust for the user is employed in Boolean conjunctive logic for the zone of trust literal, and therefore factored into the security policy. While the precise configuration of the structure of policy rules will be implementation specific, the structure of one example of a list of policy rules is provided below.

```
1. GlobalListOfAccess Control Lists[1-∞]
    a. Access Control List
        i. Non End Point Control Related Literals
        ii. ......
        iii. ......
        iv. ZoneOfTrust[0-∞]
            1. GlobalListOfZones[ordinal]
                literal-comparison-operator
                CurrentClassifiedZone
```

It should be noted that various embodiments of the policy server 311 may provide for hierarchical and other forms of aggregating zones in a policy rule definition.

Operation of the Server System

The operation of an end point control process that may be implemented by the server system 301 according to various embodiments will now be described in detail with reference to FIG. 6. In step 601, the user employs the client 313 to request a resource available through the workplace server 305. For example, the user may employ a browser application on the client 313 to provide the access server 303 with a Universal Resource Locator (URL) associated with a desired resource available through the workplace server 305. As previously noted, this initial request may be submitted via an unsecured communication channel.

In response, the access server 303 performs an authorization check of the communication with the policy server 311 in step 603. If the communication is part of an existing authenticated communication session (and the end point control process thus has already been performed for the client 313), the remainder of the end point control process may be skipped. Likewise, if the requested resource does not require authentication or end point control (e.g., it is a publicly available resource), then again the remainder of the end point control process may be skipped and the client 313 allowed to obtain the requested resource.

If, however, a secure communication session has not been initiated and the requested resource is not a public resource, then the access server 303 transfers control of communications with the client 313 to the provisioning server 307, so that the provisioning server 307 may begin the pre-authentication interrogation of the client 313. Accordingly, in step 605, the provisioning server 307 downloads the pre-authentication interrogator to the client 313. If the pre-authentication interrogator is successfully installed, then the pre-authentication interrogator will transmit a report of the client's operating environment back to the EPC server 309. With some embodiments of the invention, the pre-authentication interrogator may also send a message to the EPC server 309 confirming its successful information. The interrogation report may include information regarding artifacts on the client 313, such as its operating system name and version, whether the browser supports the Java programming language, and the like.

The pre-authentication interrogator agent may be, for example, a Java applet that can be installed and activated through the browser without being blocked by any security features of the client 313. The pre-authentication interrogator agent requires no input, and returns various data to the provisioning server 307. The pre-authentication interrogator agent is used by the server system 301 to determine artifacts on the client 313, in order to select the kind of post-authentication interrogator to employ to complete the determination of artifacts and agents. In addition, the provisioning server 307 may use the information provided by the pre-authentication interrogator agent to facilitate provisioning of additional agents on the client 313.

The fundamental data structure used to communicate interrogation results between the provisioning server 307 and the pre-authentication interrogator agent is the pre-authentication interrogator agent artifacts schema. This data structure is a fixed set of elements that the pre-authentication interrogator agent populates and sends to the provisioning server 307. While the precise configuration of the structure of schema will be implementation specific, various examples of elements that may be employed in the schema may include operating system information for the client 313, such as the operating system name, version, most recent service pack, and build, and the client's processor type. The elements may also include information regarding the browser being used to access the resources, such as the browser name, and version, the version of JavaScript supported by the browser, the vender and the version of Java supported by the browser. Still further, the schema elements may include the local (human) language used by the client 313, the size of the monitor employed by the client 313, and any other desired environmental information that may be accessible by the pre-authentication interrogator agent.

With various embodiments of the invention, the pre-authentication interrogator agent will obtain the information to populate the artifacts schema from conventionally available sources on the client 313. For example, if the client 313 is employing the Microsoft Internet Explorer browser application available from Microsoft Corporation of Redmond, Wash., then the pre-authentication interrogator agent may obtain the information from the Document Object Model of the browser. It should be noted that other methods well known in the art can alternately or additionally be used to determine information to populate the artifacts schema, such as the availability of Active-X or Java, if the pre-authentication interrogation of the client environment does not report on them. Once the schema is populated, the pre-authentication interrogator agent may then report the schema back to the EPC server 307 using, for example, a cookie.

The provisioning server 307 then transfers control to the EPC server 309, so that the EPC server 309 can process the results provided by the pre-authentication interrogator. In step 607, the EPC server 309 determines whether it has received an interrogation report from the pre-authentication interrogator installed on the client 313. If it did not receive an interrogation report, then the EPC server 309 may terminate communications with the client 313. If the EPC server 309 did receive an interrogation report, then in step 609 the EPC server 309 determines which process objects, if any, should be downloaded to the client 313. More particularly, based upon the information obtained by the pre-authentication interrogator agent, such as the operating system, processor, Java runtime, and Active-X runtime used by the client 313, the EPC server 309 identifies various security objects that should be installed on the client 313.

For some client configurations, the administrator may not require any process objects to be downloaded to the client. For example, if the client 313 is employing an operating system that is an infrequent target of malware (such as the Macintosh operating system provided by Apple Computers), then the EPC server 309 may determine that no process objects should be downloaded to the client 313. If, however, the client 313 is employing an operating system that is a frequent target of malware (such as the Microsoft Windows operating system available from Microsoft Corporation of Redmond, Wash.), then the EPC server 309 may identify one or more security process objects that should be downloaded to the client 313. As discussed in detail above, these process objects are downloaded before the authentication process is started. Accordingly, the administrator may desire that security process objects, such as anti-malware agents, be downloaded to the client 313 to better protect the confidentiality of the user's credentials during the subsequent authentication process.

Accordingly, in step 611, the provisioning server 311 downloads any process objects designated by the EPC server 309 to the client 313. If the process objects downloaded to the client 313 were successfully installed and operating, they will transmit a communication reporting their successful installation to the EPC server 309. Thus, in step 613, the EPC server 309 checks to confirm that the downloaded process objects were successfully installed. If they were not, then the EPC server 309 may terminate communications with the client 313. If the downloaded process objects were successfully installed, however, then the EPC server 309 transfers control of communication with the client 313 to the policy server 311 to authenticate the user.

Accordingly, in step 615, the policy server 311, requests credential information from the user, and subsequently authenticates the user in step 617. If the user fails to authenticate, then communications with the client 313 are terminated. If the user is successfully authenticated, then control over the communication with the client 313 is transferred back to the EPC server 309 in order to perform the post-authentication portion of the end point control process.

During the authentication process, the user will identify himself or herself, either directly or indirectly, as a member of a community or a realm. Accordingly, in step 619, the EPC Server determines which zones of trust, if any, are configured for the community or realm for which the user is an authenticated member. If one or more zones of trust are configured for the user's community (or realm), then, in step 621, the provisioning server 307 downloads an end point installer agent to the client 313. If a zone of trust was not configured for the user's community (or realm), then the process proceeds to step 629.

As noted above, various embodiments of the invention may allow a user to request a resource using a variety of different communication techniques. Moreover, as will be discussed in more detail below, some embodiments of the invention may even provision the client 313 with communication process objects necessary to switch communication techniques while requesting a resource, thereby enabling the client 313 to employ the most convenient or beneficial communication technique available to obtain the resource. In order to allow the client 313 to switch communication techniques without having to reauthenticate the user, these embodiments of the invention may provide the client 313 with a set of authentication credentials confirming that the user's identity already has been authenticated by the policy server 309.

For example, some embodiments of the invention may create a cookie on the client 313 that includes authentication information confirming that the user's identity already has been authenticated by the policy server 309. Because this authentication information may be universal for the different communication techniques provided by the server system 301, the client 313 will not have to resubmit the user's credentials in order to establish a secure communication channel after switching to a different communication technique.

The end point installer agent is used to facilitate the subsequent provisioning of process objects on the client 313. Accordingly, the end point installer agent will be an agent configured to work with the client's operating environment to reliably install specified process objects onto the client 313. As previously noted, a client may employ a browser application, such as the Microsoft Internet Explorer browser application, to communicate with the server system 301. Accordingly, various embodiments of the invention will employ an end point installer agent compatible with the Microsoft Internet Explorer browser application.

For example, some embodiments of the invention may employ an end point installer agent implemented as an ActiveX control. Depending upon the user's privileges for installing new software applications on the client 313, the browser may install the end point installer agent onto the client directly from a .cab file downloaded from the provisioning server 307. If the user does not have sufficient privileges to install ActiveX controls, various embodiments of the invention may employ additional processes to facilitate the installation of the end point installer agent.

Thus, if the client 313 is employing the Microsoft Windows operating system available from Microsoft Corporation of Redmond, Wash., some embodiments of the invention may also download a Java applet, referred to as an end point loader, to facilitate the download and installation of the end point installer agent. The end point loader will download a .cab for the end point installer agent file, and then use the Java Native Interface (JNI) to extract the .cab file into, for example, one or more .dll and .inf files and instantiate the end point installer agent. The end point loader will then instruct the end point installer agent to register itself with the operating system. When this process is employed, however, the end point installer agent is configured to register itself in the "users" portion of the Microsoft Windows COM registry instead of the "system" portion of the Microsoft Windows COM registry where ActiveX controls typically are registered, thereby allowing the end point installer agent to install and run regardless of the user's installation privileges.

Various embodiments of the invention may use a variety of techniques to avoid obstructions presented by the security protections of different operating systems. For example, when updated with the Microsoft Windows Service Pack 2, the Microsoft Windows operating system may not allow a user to install an Active X control without requiring the user to acknowledge an additional prompt. To avoid requiring the user to specifically acknowledge this prompt, various embodiments of the invention may employ JavaScript programming to acknowledge the prompt and complete the installation of the end point installer agent. For a client 313 that does not employ the Microsoft Internet Explorer browser application, various embodiments may employ similar Java-based or other software language-based end point installer agents.

Once the end point installer agent is installed, it will then accept instructions from the provisioning server 307. When the provisioning server 307 desires to install a process object, it may instruct the end point installer agent to download one or more process components from the provisioning server 307. For example, the provisioning server 307 may send the end point installer agent HTTP format instructions to install components located at the provisioning server 307. The end point installer agent will obtain an .inf file for the components, which lists the required pieces of components, and the version information for the components. The end point installer agent will then compare the version information in the downloaded file with version information for any corresponding components already present on the client 313.

If the version information indicates that the resident components are newer, the end point installer agent will then enter this determination and any associated information into a log, and discontinue the installation process. If, however, the end point installer agent determines from the version information that the components on the provisioning server, it will request the new components from the provisioning server and install them. The network-intense download of components is thus performed only when required. More particularly, it will rename the resident components, install the newly obtained components, and then delete the renamed components (e.g., marks them for deletion upon rebooting of the client 313). This ensures that some form of the components can be salvaged for use by the client 313 if the installation process fails. With various embodiments of the invention, the end point installer agent will only install components that have a verifiable signature confirming their authenticity from trusted source.

With some embodiments of the invention, the end point installer agent will keep a record of files that it installs, and has the capability of subsequently uninstalling all these files in a single operation, so that all of these file can be subsequently uninstalled at the conclusion of the communication session. For example, if the process object is installed through various browser software applications, the browser may provide a feature to uninstall specified processes. For process objects installed via the end point loader or the Java native interface, an uninstaller agent may be installed with the end point installer agent. This uninstaller agent can then uninstall all previously loaded process objects. This may be done by specific prompt, or by automatic detection of end of communication session.

Figure 7:
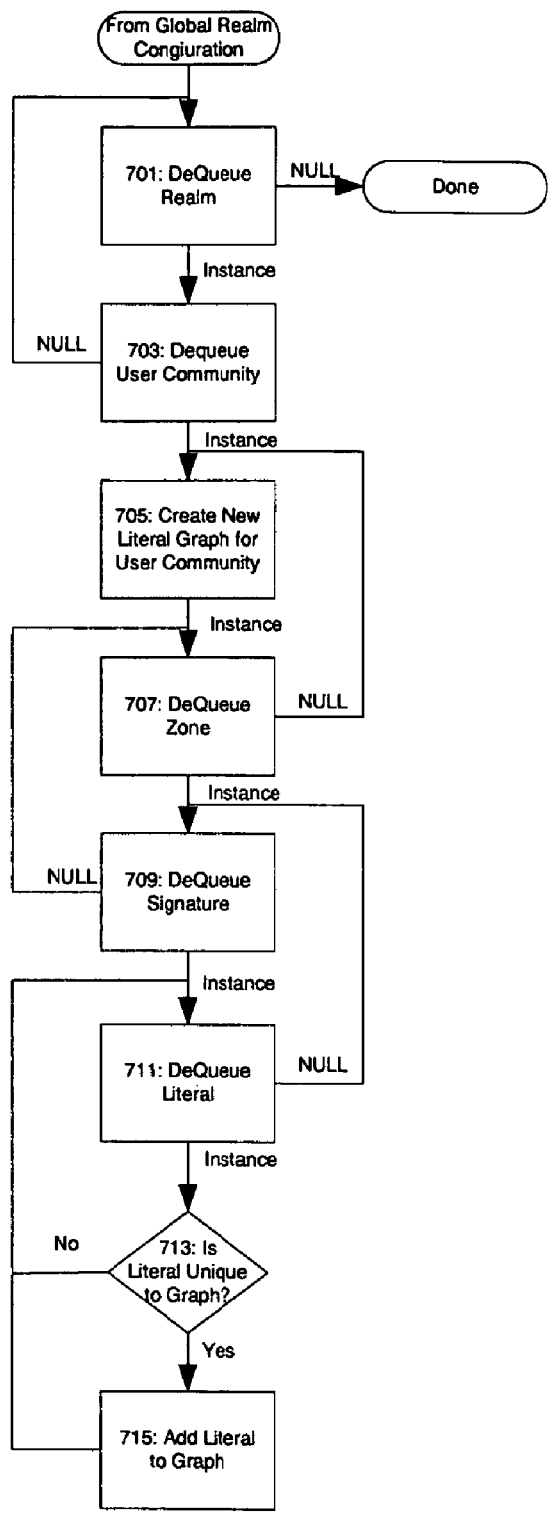
FIG. 7 illustrates one technique that may be used by various embodiments of the invention to create a post-authentication interrogator agent manifest request according to various embodiments of the invention.

Next, in step 623, the EPC server 309 creates an interrogation manifest request based upon the zones configured for the user's community or realm. One example of how this interrogation manifest request may be created will be discussed with reference to FIG. 7. More particularly, FIG. 7 illustrates one technique that may be used by various embodiments of the invention to create a post-authentication interrogator agent manifest request according to various embodiments of the invention. As seen in this figure, in step 701 the EPC server 309 initially selects the next available realm from among the list of all available realms. If there are no further realms to select, then the EPC server 309 concludes that the manifest request creation process is completed. If, however, there is a realm remaining in the list of available realms, in step 703 the EPC server selects the next available user community in the realm. If there is no remaining user community available for the realm, then the process returns to the step 701. If, however, there is a user community in the realm that has not yet been processed, in step 705 the EPC server 309 creates a literal graph for that user community.

Next, in step 707, the EPC server will obtain the next available zone in the list of zones associated with the user community. If there are no further zones listed for that user community, then the process returns to step 705. Otherwise, the EPC server 309 will obtain the first signature listed for the current zone. If there are no further available signatures, then the EPC server will return to step 707 to obtain the next available zone for the user community. If, however, a signature is available for analysis, then in step 711 the EPC server 309 will obtain the first literal specified in the definition of that signature. If there is no remaining literal designated for the signature, then the process returns to step 709, where the EPC server 309 will obtain the next available signature for the current zone. If however, there is another literal specified for the signature, then in step 713 the EPC server determines whether the literal is unique to the current literal graph for the user community. If it is, then in step 715, the literal is added to the graph, and the EPC server 309 obtains the next literal for the signature. Otherwise, the process simply returns directly to step 711.

In this manner, each literal for each signature making up each zone for each user community in all available realms are identified and a graph is created for each zone of each user community. When a user is identified as being a member of a user community, the EPC server 309 can then simply identify the appropriate graphs for that user community, and incorporate the graph into a manifest request for processing by the post-authentication interrogator agent.

After the EPC server 309 creates an interrogation manifest request, in step 625, the provisioning server 307 downloads and installs the post-authentication interrogator with the manifest request onto the client 313. More particularly, after the installer agent has been installed on the client 313, the provisioning server 307 sends a message to the installer to instantiate the post-authentication interrogator agent. The message may be, for example, an HTML message. This message may also include, for example, a URL identifying a configuration file containing the manifest request. This configuration file may use, for example, the Microsoft Windows .ini file format.

As will be discussed in detail below, the configuration file will include commands for the post-authentication interrogator to search for specific artifacts or process objects. For example, it may include commands instructing the post authentication interrogator to look for a specified file, directory, running process, registry key, registry value or data, whether a specific personal firewall is running, user domains. This information may be obtained through conventional operating system application programming interfaces (APIs), or through APIs specifically made available by third parties, such as the providers of a process object.

The manifest request may use Hash Message Authentication Code (HMAC) signing techniques to ensure that information contained in the manifest request (or in the manifest response) is not forged by a third party for illicit uses. Also, to ensure security, queries in the manifest request may be formulated as questions prompting specific prior known answers rather than open ended questions, as open-ended questions could be viewed as a privacy threat if abused by the server administrator via clever signature definitions. For example, wildcard queries may be prohibited from the manifest request to prevent disclosure of information beyond that needed for evaluation of access control and authentication of the user session.

With various embodiments of the invention, the fundamental data structure that may be used to exchange data between the EPC server 309 and the post-authentication interrogator agent is the interrogation manifest. Unlike the pre-authentication interrogation manifest, the post-authentication interrogation manifest includes a variable number of questions in the form of literals sent from the EPC server 309 to the post-authentication interrogator agent in the manifest request, and answers added to the literals on responses sent back to the EPC server 309 by the post-authentication interrogator agent. The following presents an abstract definition of this manifest, but it should be noted that different embodiments of this structure will be implementation specific.

1. Individual Generic Queries

These literals have no input and are answered with values pertaining to the literal. There may be 0-1 occurrences per literal present in the manifest.

a. Literal=User Privilege
      i. Input=None
      ii. Output=Admin|Power User|Restricted User
   b. Literal=MAC Addresses
      i. Input=None
      ii. Output=List of MAC addresses
   c. Literal=Link Speed
      i. Input=None
      ii. Output=Kbps of SSL VPN link
   d. Literal=User Home Directory
      i. Input=None
      ii. Output=User Home Directory
   e. Literal=System Directory
      i. Input=None
      ii. Output=User Home Directory 2. Individual Specific Queries These literals all have input that is interpreted as an equality expression. There may be 0-∞ occurrences per literal present in the manifest.

a. Literal=File
      i. Input=Leaf Path Name
      ii. Output=TRUE if found, else FALSE
   b. Literal=Directory
      i. Input=Intermediate Path Name
      ii. Output=TRUE if found, else FALSE
   c. Literal=Process
      i. Input=Process Name [AUTHENTICODE_CHECK]
      ii. Output=TRUE if running and if required, authenticode verified, else FALSE
   d. Literal=Registry (WIN-ONLY)
      i. Input=Key Name [Value [Data]], Literal Comparison Operator
      ii. Output=TRUE if Key Name present, and if present, Value and Data match Literal Comparison Operator, else FALSE
   e. Literal=User Domain
      i. Input=WINS_DOMAIN|DNS_DOMAIN
      ii. Output=TRUE if user is logged into domain, else FALSE
   f. Literal=Machine Domain
      i. Input=WINS Name|DNS Name
      ii. Output=TRUE if client device is a domain member, else FALSE 3. Set Individual Keyword Queries These literals all have input that is interpreted as described by the output. There may be 0-1 occurrences per literal in the set.

a. Literal Set=ZONE_PFW|Sygate_PFW|MS_PFW
      i. Input=None
      ii. Output=TRUE if firewall running, else FALSE; for each keyword present in the set
   b. Literal Set=McAfee_AV|Nortal_AV
      i. Input=None
      ii. Output=TRUE if AV running, else FALSE; for each keyword present in the set
   c. Literal Set=CONNECT, BET, ODX, ODJ, NG
      i. Input=None.
      ii. Output=NOT_INSTALED, or INSTALLED, or RUNNING; for each keyword present in the set After it has been installed on the client 313, the post-authentication interrogator examines the operating environment of the client 313, looking for artifacts and process objects specified in the post-authentication interrogator manifest request. It then reports back its findings via a post-authentication interrogator manifest response to the EPC server 309 in step 627. For example, the post-authentication interrogator may create an XML file containing the interrogation results, and post these results back to the EPC server 309.

Based upon the information returned by the post-authentication interrogator agent, the EPC server 309 will classify the client's operating environment into a zone of trust in step 629. This process will be described in more detail with reference to FIG. 8.

Figure 8:
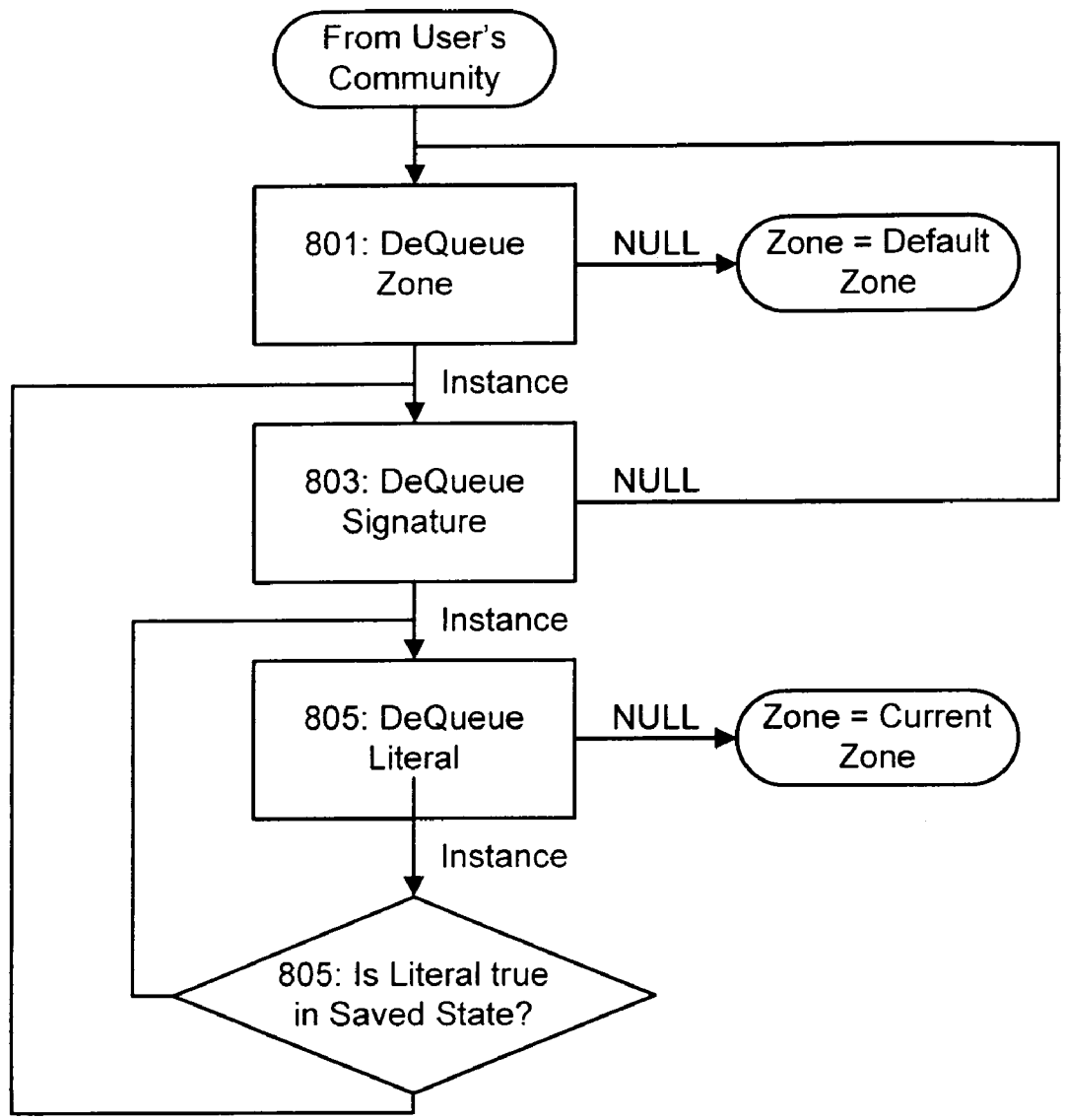
FIG. 8 illustrates a process by which a client's operating environment is matched to the appropriate zone of trust.

FIG. 8 illustrates a process by which a client's operating environment is matched to the appropriate zone of trust. As seen in this figure, in step 801, the policy server 311 obtains the next available zone of trust from the list of all zones of trust associated with the user's community. If there are no further zones of trust available for the user's community that have not already been analyzed, then the policy server 311 classifies the client's operating environment in the default zone of trust. If, however, there is an available zone of trust in the user's community that has not been analyzed, the next available signature for the zone of trust is obtained in step 803.

If there are no further signatures in the definition of the current zone of trust, then the process returns to step 801. Otherwise, the policy server 311 obtains the next the next available literal in the obtained device profile in step 805. If there are no further literals in the signature, then the operating environment of the client 313 is categorized into the current zone. Otherwise, the obtained literal is compared with the corresponding state of the client's operating environment. If the value of the literal is true for the current operating environment, then the process returns to step 805 to examine the next literal available in the signature. If, however, the value of the literal is not true for the client 313, then the process returns to step 803 to obtain the next available signature for the current zone.

Next, in step 631, the policy server 311 may provision the client 313 with any suitable with communication process objects that will enable the client 313 to employ an alternate communication technique for communicating with the server system 313. As previously discussed, various embodiments of the invention may provide different communication techniques for securely communicating with the server system 301, and subsequently obtaining resources from or through the server system 301.

For example, some embodiments of the invention will accommodate one communication technique employing a conventional browser. Various embodiments of the invention may alternately or additionally accommodate another communication technique employing the Microsoft Windows Internet Explorer browser where the communication functionality has been enhanced by an ActiveX control. These embodiments of the invention may further accommodate a communication technique implemented by a Java-enabled application that is specifically configured for securely communicating with the server system 301. Still further, various embodiments of the invention may accommodate a communication technique implemented by a special purpose software application that works with the client's operating system. For example, some embodiments may support a communication technique implemented by a software application that is a client of the Microsoft Windows operating system provided by Microsoft Corporation of Redmond, Wash.

As will be appreciated by those of ordinary skill in the art, in some situations, one communication technique may be preferable to another communication technique. For example, if a client 313 is employing the Microsoft Windows operating system, the user may obtain more effective communication with the server system 301 by employing a special purpose software application than by using a browser application to communicate with the server system 301. On the other hand, if the client 313 is not employing the Microsoft Windows operating system, then a special purpose software application which requires the Microsoft Windows operating system to run would not be useful for communication with the server system 301. Instead, the user would be better served using a communication technique implemented by a Java-enabled application, Accordingly, various embodiments of the invention may provision a client 313 with communication process objects that will enable the client 313 to employ a communication technique most suitable to the client's operating environment. More particularly, these embodiments of the invention may employ the information obtained from one or more interrogator agents to determine which communication techniques can be supported by the client 313. The provisioning server 313 can then provision the client 313 with the communication process objects to implement one or more of these communication techniques.

For example, the provisioning server 307 may determine from the client's signature whether the client 313 is employing the Microsoft Windows operating system. If the client 313 is employing the Microsoft Windows operating system, then the provisioning server 307 may download and install a software application that is a client of the Microsoft Windows operating system to establish a secure connection with the server system 301. Similarly, the provisioning server 307 may determine from the client's signature whether the client 313 is Java enabled and, if it is, then the provisioning server 307 may download and install a Java-based software application to establish a secure connection with the server system 301. Still further, the provisioning server 307 may determine from the client's signature whether the client 313 is employing the Microsoft Internet Explorer browser and will allow the installation of ActiveX controls. If it does, then the provisioning server 307 may download and install an ActiveX control to help the Microsoft Internet Explorer browser establish a secure connection with the server system 301.

With various embodiments of the invention, the provisioning server 307 may provision the client 313 with communication process objects in this manner according to any desired criteria. For example, the provisioning server 307 may provision the client 313 with every communication process object that the client 313 will support. Alternately, the provisioning server 307 may provision the client 313 with a communication process object based upon a preset hierarchy, or based upon heuristics accounting for communication process objects already installed on the client 313. It also should be noted that, if the end point installer agent was not previously installed during step 621, it may be installed at this point to facilitate the installation of the communication process objects.

In step 633, the EPC server 309 determines whether the client 313 should be provisioned with any additional security process objects based upon the zone of trust into which the client 313 has been classified. In addition to specifying artifacts and process objects that must be resident on the client 313 in order to be classified in the zone of trust, the definition of the zone of trust may also require that additional process objects, such as additional security process objects, be installed on the client 313 in order for the client to remain classified in that zone of trust. Accordingly, the provisioning server 307 will provision the client 313 with any additional security process object required by the EPC server. It should be noted that, if the end point installer agent was not previously installed during step 621, it may be installed at this point to facilitate the installation of the additional security process objects.

After being installed on the client 313, the additional security process objects may report the results of their successful installation to the provisioning server 307. Accordingly, the provisioning server 307 will confirm that the required additional security process objects were properly installed on the client 313. Upon successful installation, these additional security process objects report back their security status to the EPC server 309. If one or more of the additional security process objects were not properly installed or failed to report positive status to the EPC server 309, then the server system may discontinue communicating with the client 313. Alternately, various embodiments of the server system 301 may attempt to remediate the classification of the client 313 into another zone of trust that does not require installation of the additional security process objects.

Lastly, in step 635 the EPC server 309 may asynchronously and periodically revalidate the state of the client's operating environment, For example, the EPC server 309 may periodically request that the post-authentication interrogator verify the compliancy state of agents associated with the current zone of trust. It then proceeds to re-classify the zone of trust, where a zone of trust change may occur due to the current compliancy state of the client device.

CONCLUSION

It should be noted that, while particular examples of the invention are described in detail above, there are numerous variations and permutations of the invention. For example, some embodiments of the invention may employ zones of trust without regard to the user's identity. Thus, all clients may be assigned the same set of zones of trust, regardless of the identity of their individual users. By employing these embodiments, an administrator can ensure that all clients have an operating environment that meets minimum security requirements.

Still further, various embodiments of the invention may employ a single interrogator agent. With some of these embodiments, the single interrogator agent may interrogate the client 313 to obtain its entire signature before the authentication process. Other of these embodiments may deploy the single interrogator agent after the authentication process. Of course, still other embodiments of the invention may employ any desired number of interrogator agents to ascertain the client's operating environment.

Additionally, various embodiments of the invention may perform some task associated with a zone of trust when a client is classified into that zone of trust. For example, the server system 301 may log the client 313 off of a secure communication session if the client 313 is assigned a zone of trust associated with this command. Of course, any desired command to be enacted by the server system 301 or one of its components can be associated with a zone of trust being assigned to a client 313.

It also should be noted that, while various connections have been described above, unless otherwise expressly indicated these connections should be considered to include both direct connections between two elements or indirect connections that may include any number of intermediate elements between the connected elements. Further, while various functions have been ascribed to one or more components of particular embodiments of the invention (such as servers), various embodiments of the invention may collect or redistribute these functions in any desired configuration. For example, a single server may be used to implement the functionality of both the provisioning server 307 and the EPC server 309 described above. Alternately, some embodiments of the invention may provide three or more servers to perform that functionality. Still further, various functions ascribed to a particular server may be implemented in different embodiments of the invention by another server. For example, with some embodiments of the invention, one or more of the functions of the EPC server 309 may be performed by the policy server 311 and vice versa in alternate embodiments of the invention.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, while particular software services and processes have been described as performing various functions, it should be appreciated that the functionality of one or more of these services and processes may be combined into a single service or process, or divided among additional services and processes.

What is claimed is:

1. A method of provisioning an operating environment of a remote computer, the method comprising:
   providing a first interrogator agent for installation onto the remote computer to determine artifacts present on the remote computer;
   authenticating an identity of a user of the remote computer based on information regarding the artifacts received from the first interrogator agent;
   providing a second interrogator agent for installation on the remote computer based on the authentication of the identity of the user of the remote computer;
   determining whether to grant the user access to a resource based on:
      information received from the second interrogator agent, and
      a zone of trust associated with a user and criteria associated with the zone of trust, wherein determining the zone of trust includes:
         classifying the user as a member of a community comprising a plurality of zones of trust,
         creating a graph of signatures associated with each zone of trust, and
         associating the information concerning artifacts with a signature from the graph; and
   providing a process object for provisioning the remote computer to access the resource based on the determination.

2. The method of claim 1, wherein authenticating an identity of the user of the remote computer further comprises providing a security agent to protect user information during authentication.

3. The method of claim 1, wherein determining whether to grant the user access to the resource is further based on a rule associating the identity of the user with the process object.

4. The method of claim 1, wherein determining the zone of trust is further based on the information concerning the artifacts received from the first interrogator agent.

5. The method of claim 1 wherein determining the zone of trust is further based on information received from the second interrogator agent.

6. The method of claim 1, wherein providing the second interrogator agent is further based on the information concerning the artifacts received from the first interrogator agent.

7. The method of claim 1, further comprising providing one or more provisioning objects to the remote computer based on the information concerning the artifacts received from the first interrogator agent.

8. The method of claim 1, wherein providing the process object for provisioning the remote computer to access the resource further comprises providing a communication object configured to provide a communication technique for providing the process object to the remote computer.

9. The method of claim 8, wherein providing the communication object further comprises providing authentication information for allowing the remote computer to use the communication technique.

10. The method of claim 1, wherein providing the process object for provisioning the remote computer to access the resource further comprises providing an installer agent configured to install the process object on the remote computer.

11. The method of claim 10, wherein the installer agent is further configured to compare version information concerning process object components with version information concerning corresponding components on the remote computer and to install the components determined to be newest.

12. The method of claim 1, further comprising providing a manifest request to the second interrogator agent, the manifest request comprising a list of one or more objects to find on the remote computer.

13. A computer-readable storage medium, having embodied thereon a program, the program being executable by a processor to perform a method for provisioning an operating environment of a remote computer, the method comprising:

providing a first interrogator agent for installation onto the remote computer to determine artifacts present on the remote computer;

authenticating an identity of a user of the remote computer based on information regarding the artifacts received from the first interrogator agent;

providing a second interrogator agent for installation on the remote computer based on the authentication of the identity of the user of the remote computer;

determining whether to permit the user to access a resource based on:

information received from the second interrogator agent, and a zone of trust associated with a user and criteria associated with the zone of trust, wherein determining the zone of trust includes:

classifying the user as a member of a community comprising a plurality of zones of trust, creating a graph of signatures associated with each zone of trust, and associating the information concerning artifacts with a signature from the graph; and providing a process object for provisioning the remote computer to access the resource based on the determination.

14. The computer-readable storage medium of claim 13, wherein the program is further executable to provide a security agent to protect user information during authentication.

15. The computer-readable storage medium of claim 13, wherein the program is further executable to associate the identity of the user with the process object based on a rule.

16. The computer-readable storage medium of claim 13, wherein the program is further executable to determine the zone of trust based on the information concerning the artifacts received from the first interrogator agent and on the information received from the second interrogator agent.

* * * * *